US012806730B2

(12) United States Patent
Hsu et al.

(10) Patent No.: US 12,806,730 B2
(45) Date of Patent: Nov. 24, 2026

(54) ELECTRIC TOOL HAVING A STOP MECHANISM

(71) Applicant: Techtronic Cordless GP, Anderson, SC (US)

(72) Inventors: Miles Andrew Hsu, Anderson, SC (US); Tyler Wilson Boyles, Liberty, SC (US); Eduardo Olvera, Pendleton, SC (US); Nicholas Proby, Easley, SC (US); Andrew Maclay Schmidt, Anderson, SC (US); Lin Qiang Lin, Dongguan (CN); Wei Wei An, Dongguan (CN); Kar Tat Wong, Dongguan (CN); Adis Sabic, Dongguan (CN)

(73) Assignee: TECHTRONIC CORDLESS GP, Anderson, SC (US)

( * ) Notice: Subject to any disclaimer, the term of this patent is extended or adjusted under 35 U.S.C. 154(b) by 400 days.

(21) Appl. No.: 18/531,101

(22) Filed: Dec. 6, 2023

(65) Prior Publication Data

US 2024/0180075 A1 Jun. 6, 2024

(30) Foreign Application Priority Data

Dec. 6, 2022 (CN) ......................... 202211558090.7
Dec. 6, 2022 (CN) ......................... 202223264656.3

(51) Int. Cl.
*B24B 23/02* (2006.01)
*B25F 5/02* (2006.01)
(Continued)

(52) U.S. Cl.
CPC .............. *B24B 23/022* (2013.01); *B25F 5/02* (2013.01); *F16H 19/001* (2013.01); *A01D 34/84* (2013.01); *F16H 2019/008* (2013.01)

(58) Field of Classification Search
CPC .. F16H 2019/008; F16H 19/001; B25F 5/902; B24B 23/022; A01D 34/84; A01D 34/828; A01D 34/76; A01D 34/6812
See application file for complete search history.

(56) References Cited

U.S. PATENT DOCUMENTS 4,463,544 A 8/1984 Carsello et al.
4,962,631 A 10/1990 Braun et al.
(Continued)

FOREIGN PATENT DOCUMENTS

AU 635408 B2 3/1993
CN 1239912 A * 12/1999 ............ B24B 23/02
(Continued)

OTHER PUBLICATIONS

European Search Report Corresponding to Application No. 23214527 on May 22, 2024.
(Continued)

*Primary Examiner* — Arpad Fabian-Kovacs
(74) *Attorney, Agent, or Firm* — Dority & Manning, P.A.

(57) ABSTRACT

An electric tool including a body, an operating component, an output shaft, and a stop mechanism. An arresting disc is disposed on the output shaft, and a groove is formed on the arresting disc. The stop mechanism includes a protrusion, for example, a pin, which is operable so that the protrusion extends to insert into the groove to lock the output shaft. A stop mechanism is easy to operate, delivers good safety performance, and has a relatively simple structure, which allows convenient production and subsequent maintenance. Further, the stop mechanism may automatically spring back to a non-stop position at which it detaches from the output shaft or the transmission gear of the transmission mechanism when the external force is lost, which prevents possible damage to the output shaft or transmission mechanism when
(Continued)

a user starts the electric tool before releasing the stop mechanism.

20 Claims, 23 Drawing Sheets

(51) Int. Cl.
*F16H 19/00* (2006.01)
*A01D 34/84* (2006.01)

(56) References Cited

U.S. PATENT DOCUMENTS

| | | | |
|---|---|---|---|
| 4,979,573 A | 12/1990 | Williamson | |
| 5,156,217 A | 10/1992 | Hirata et al. | |
| 5,301,757 A | 4/1994 | Kelley, Jr. | |
| 5,437,334 A | 8/1995 | Hirata et al. | |
| 5,477,928 A | 12/1995 | Forgrave | |
| 6,263,975 B1 | 7/2001 | Rosa et al. | |
| 10,512,215 B1 | 12/2019 | Henneberry | |
| 2002/0011127 A1* | 1/2002 | Torii | F16H 1/16 74/425 |
| 2002/0020239 A1* | 2/2002 | Adachi | F16H 1/16 74/425 |
| 2002/0095924 A1 | 7/2002 | Hixon | |
| 2005/0066642 A1 | 3/2005 | Sugden et al. | |
| 2009/0255695 A1 | 10/2009 | Breneman et al. | |
| 2018/0104809 A1* | 4/2018 | Dyer | B27B 17/0016 |
| 2020/0068802 A1 | 3/2020 | Laurin et al. | |
| 2023/0302622 A1* | 9/2023 | Sasaki | H02K 5/161 |
| 2023/0381875 A1* | 11/2023 | Li | B23D 47/126 |

FOREIGN PATENT DOCUMENTS

| | | | | | |
|---|---|---|---|---|---|
| CN | 2779838 | Y | | 5/2006 | |
| CN | 101360587 | A | * | 2/2009 | B25F 5/006 |
| CN | 201609037 | U | | 10/2010 | |
| CN | 1906997 | B | | 12/2010 | |
| CN | 103283348 | A | | 9/2013 | |
| CN | 103538037 | A | * | 1/2014 | B25D 16/006 |
| CN | 203492378 | U | | 3/2014 | |
| CN | 102771249 | B | | 4/2015 | |
| CN | 205567104 | U | | 9/2016 | |
| CN | 104412767 | B | | 11/2016 | |
| CN | 103766062 | B | | 6/2017 | |
| CN | 106982557 | A | | 7/2017 | |
| CN | 209151590 | U | | 7/2017 | |
| CN | 106993430 | A | | 8/2017 | |
| CN | 206575840 | U | | 10/2017 | |
| CN | 207509164 | U | * | 6/2018 | A01D 69/08 |
| CN | 108243730 | A | | 7/2018 | |
| CN | 108323312 | A | | 7/2018 | |
| CN | 207948148 | U | | 10/2018 | |
| CN | 208159348 | U | | 11/2018 | |
| CN | 208446056 | U | | 2/2019 | |
| CN | 111185882 | A | * | 5/2020 | B25F 5/001 |
| CN | 211000764 | U | | 7/2020 | |
| CN | 211128991 | U | | 7/2020 | |
| CN | 112806164 | A | | 5/2021 | |
| DE | 102018206176 | A1 | * | 10/2019 | A01D 34/84 |
| EP | 1759813 | A2 | | 3/2007 | |
| EP | 1749433 | B1 | | 10/2008 | |
| EP | 1974595 | B1 | | 1/2013 | |
| EP | 2724603 | B1 | | 5/2016 | |
| EP | 4477053 | A1 | * | 12/2024 | B25F 5/02 |
| WO | WO2007019726 | A1 | | 2/2007 | |
| WO | WO2022095015 | A1 | | 5/2022 | |

OTHER PUBLICATIONS

Chinese Office Action Corresponding to Application No. 202210507445 on Nov. 25, 2025.

* cited by examiner

ELECTRIC TOOL HAVING A STOP MECHANISM

This application claims priority to Chinese Patent Application No. CN202211558090.7, filed on Dec. 6, 2022, and CN Patent Application No. CN202223264656.3, filed on Dec. 6, 2022, the disclosures of which are incorporated by reference herein in their entireties.

TECHNICAL FIELD

The present invention relates to an electric tool, particularly an electric tool for gardening, for example, an edger or a mower.

BACKGROUND ART

Operating components, such as cutter blades and saw blades, of some electric tools currently available on the market may be disassembled, repaired, and replaced by users. Before disassembling an operating component, a user needs to shut down the machine to avoid safety hazards. In order to further enhance safety, some operating components provide additional safety measures to avoid accidental operation of the operating components during disassembly. However, some existing safety measures are structurally complex, having high costs in production, processing, and subsequent maintenance; some other safety measures, although structurally simple, have poor safety performance, unable to eliminate the possibility of a safety hazard.

Moreover, common electric tools currently available on the market, especially gardening electric tools, such as edgers, are usually designed with height adjustment functions to make an electric tool suitable for a curb having different heights of sides or an uneven operating plane. However, the height adjustment functions of existing electric tools are relatively simple, with which only the operating height of the body relative to the ground (that is, relative to the wheel bottom) is adjustable but the relative height between wheels is non-adjustable, which makes the electric tool unsuitable for an operating plane with different heights or degrees of unevenness on the left and right sides thereof.

Therefore, it is necessary to provide an electric tool to at least partially solve the above problems.

SUMMARY OF THE INVENTION

An objective of the present invention is to provide an electric tool, particularly an electric tool for gardening, for example, an edger or a mower. An electric tool of the present invention provides a stop mechanism for preventing the operation of an operating component during the replacement of the operating component, wherein the stop mechanism acts on the output shaft or the transmission gear of the transmission mechanism of the electric tool. A stop mechanism of the present invention is easy to operate, delivers good safety performance, and has a simple structure, which allows convenient production, manufacturing, and subsequent maintenance. Further, a stop mechanism of the present invention automatically springs back to a non-stop position detached from the output shaft or the transmission gear when the external force (for example, a manually applied pressing force) is lost, which prevents possible damage to the output shaft or transmission mechanism when a user starts the electric tool before releasing the stop mechanism.

According to one aspect of the present invention, an electric tool is provided, comprising:

a body internally provided with a motor;

an operating component mounted on one side of the body;

an output shaft configured to transmit the output of the motor to the operating component, wherein an arresting disc is provided on the output shaft, and a groove is formed on an end face of the arresting disc; and a stop mechanism comprising a protrusion, preferably a pin, the stop mechanism being operable so that the protrusion extends to insert into the groove to lock the output shaft.

In one embodiment, the groove extends radially along a base of the arresting disc and has a radially outward opening, and the protrusion is configured to enter the groove radially inwards through the opening.

Specifically, the groove is formed at the edge of the base, preferably at least two grooves are arranged on the base, and, preferably, the at least two of the grooves are evenly spaced circumferentially.

In one embodiment, a plurality of protruding curved segments extending circumferentially are arranged on the base, and the spacing between adjacent curved segments forms the groove, wherein, specifically the number of curved segments is four, specifically the plurality of curved segments extend along the circumferential edge of the base, and specifically the length of the curved segment is ⅙-⅕ of the circumference of the base.

In one embodiment, each end of each curved segment is formed with an extension segment that extends radially relative to the curved segment, and opposite extension segments of adjacent curved segments are laterally parallel to each other to jointly define the groove, wherein, preferably, the length of the extension segment extending radially inwards relative to the curved segment is ⅕-⅓ of the radius of the base.

In one embodiment, the stop mechanism further comprises:

an operating component, which protrudes from the housing of the body and joins one end of the protrusion; and an elastic component, which is connected to the operating component and/or the protrusion and provides the protrusion with a restoring force offset towards the direction in which the protrusion detaches from the groove.

In one embodiment, the operating component comprises an end wall and a continuous side wall connected to the end wall, wherein the end wall and the side wall jointly define an accommodating space having a receiving sleeve connected to the end wall, the protrusion is inserted into the receiving sleeve, and the elastic component is preferably a spring surrounding the protrusion.

In one embodiment, the operating component further comprises at least two clasp feet extending from the side wall away from the end wall, and the ends of the clasp feet may be snap-fitted to the housing of the body.

In one embodiment, the electric tool further comprises a transmission gear, the base of the arresting disc is integrally formed on an end face of the transmission gear, a driving gear fixedly mounted on the output end of the motor shaft of the motor, and the transmission gear and the driving gear externally engage, wherein, specifically, the diameter of the transmission gear is larger than that of the driving gear, and, specifically, the output shaft of the electric tool is coaxially and fixedly connected to the transmission gear.

In one embodiment, an assembly shell for accommodating the driving gear and the transmission gear is provided in the housing of the body, wherein the inner contour of the assembly shell fits the outer contour of the driving gear and the transmission gear, and the motor shaft, the output shaft of the electric tool, and the protrusion respectively run through the assembly shell.

In one embodiment, the output shaft is a motor shaft of the motor, one end of the output shaft near the motor is provided with a recessed shaft shoulder, a recessed platform portion extends from the shaft shoulder towards the other end of the output shaft, and a central through-hole of the arresting disc is provided with a flat portion corresponding to the platform portion, wherein an end face of the arresting disc rests against the shaft shoulder, and the flat portion is assembled on the platform portion.

In one embodiment, a mounting support is mounted on the housing corresponding to the arresting disc, and a vane is provided on the mounting support, wherein the vane is provided with an opening, the protrusion can enter the groove through the opening, at least two slots are arranged around the opening, and the at least two clasp feet are movable through the at least two slots.

In one embodiment, a frame is mounted on the housing, the frame having a central base and at least two curved arms located outside the central base, wherein the at least two curved arms are spaced apart from each other through at least two connecting arms and connected to the central base respectively through the connecting arms, and the mounting support is mounted between two connecting arms.

In one embodiment, the elastic member is arranged between the operating member and/or the protrusion and the vane.

In one embodiment, the electric tool is an electric tool for gardening, particularly an edger or mower.

In one embodiment, the electric tool comprises:

- a front wheel and a support wheel that are located on one side of the body, the support wheel being in a rear position relative to the front wheel, and a dropping wheel located on the other side of the body, wherein the operating component and the support wheel are located on the same side of the body;
- a body lifting mechanism configured to adjust the height of the body relative to the support wheel; and
- a dropping wheel lifting mechanism configured to adjust the height of the dropping wheel relative to the body.

In one embodiment, the electric tool comprises a support wheel mounting bracket located between the support wheel and the body, and a shaft fixedly connected to the support wheel mounting bracket, the shaft is parallel to the wheel shaft of the support wheel and rotatably inserted into the body, and the support wheel mounting bracket is fixedly connected to the wheel shaft, wherein the body lifting mechanism is configured to be operable to pivot the support wheel mounting bracket around the shaft relative to the body.

In one embodiment, the body lifting mechanism comprises a body lifting control handle located between the support wheel mounting bracket and the body, wherein the body lifting control handle is configured to be rotatable relative to the body in a rotation plane perpendicular to the wheel shaft and to be locked when it rotates to a predetermined angular position relative to the body, wherein,

- preferably, the body lifting control handle and the support wheel mounting bracket are fixedly connectible to each other, and,
- more preferably, the bottom end of the body lifting control handle is provided with an protruding tongue piece, and a slot is provided on the support wheel mounting bracket, wherein the tongue piece extends from the inner side of the support wheel mounting bracket through the slot to the outer side of the support wheel mounting bracket, bends, and then is fixed to the outer surface of the support wheel mounting bracket through a fixing member.

In one embodiment, the top of the body is formed with at least two limit grooves facing the opening of the support wheel and arranged substantially in a forward and backward direction, and the body lifting control handle can be accommodated in the limit grooves to be locked at different angular positions relative to the body.

In one embodiment, the support wheel mounting bracket is formed into a triangle, a first end of the support wheel mounting bracket is connected to the shaft, and a second end of the support wheel mounting bracket is fixedly connected to the wheel shaft, wherein, preferably, a third end of the support wheel mounting bracket is connected, through a front and rear wheel connecting rod, to a front wheel mounting bracket for mounting the front wheel.

In one embodiment, the front wheel mounting bracket is triangular, the front and rear wheel connecting rod is connected to a first end of the front wheel mounting bracket, a second end of the front wheel mounting bracket is fixedly connected to the wheel shaft of the front wheel, and a third end of the support wheel mounting bracket is pivotally connected to the body.

In one embodiment, the electric tool comprises a dropping wheel mounting bracket located between the dropping wheel and the body, the dropping wheel lifting mechanism being configured to be operable so that the wheel shaft of the dropping wheel is pivotable relative to the dropping wheel mounting bracket.

In one embodiment, the shaft runs through the body and is fixedly connected to the dropping wheel mounting bracket.

In one embodiment, the dropping wheel comprises a hub and a hub carrier located between the hub and the dropping wheel mounting bracket, wherein the portion of the hub carrier near a first edge thereof is fixedly connected to the wheel shaft of the dropping wheel, and the portion of the hub carrier near a second edge thereof is connected to the dropping wheel mounting bracket through a pivot, wherein the first edge and the second edge are opposite edges of the hub carrier, and the dropping wheel lifting mechanism is positioned between the dropping wheel mounting bracket and the hub carrier.

BRIEF DESCRIPTION OF THE DRAWINGS

To better understand the above and other objectives, features, advantages and functions of the present invention, reference may be made to the preferred embodiments shown in the drawings. In the drawings, identical reference symbols denote identical components. Those skilled in the art should understand that the drawings are intended to illustrate preferred embodiments of the present invention schematically, and have no limiting effect on the scope of the present invention, and the various components in the drawings are not drawn to scale.

FIG. 22A and FIG. 22B are respectively an exploded view of the rear wheel mounting component and hub carrier in FIG. 20, wherein FIG. 22A and FIG. 22B present different perspectives.

SPECIFIC EMBODIMENTS

Figure 1:
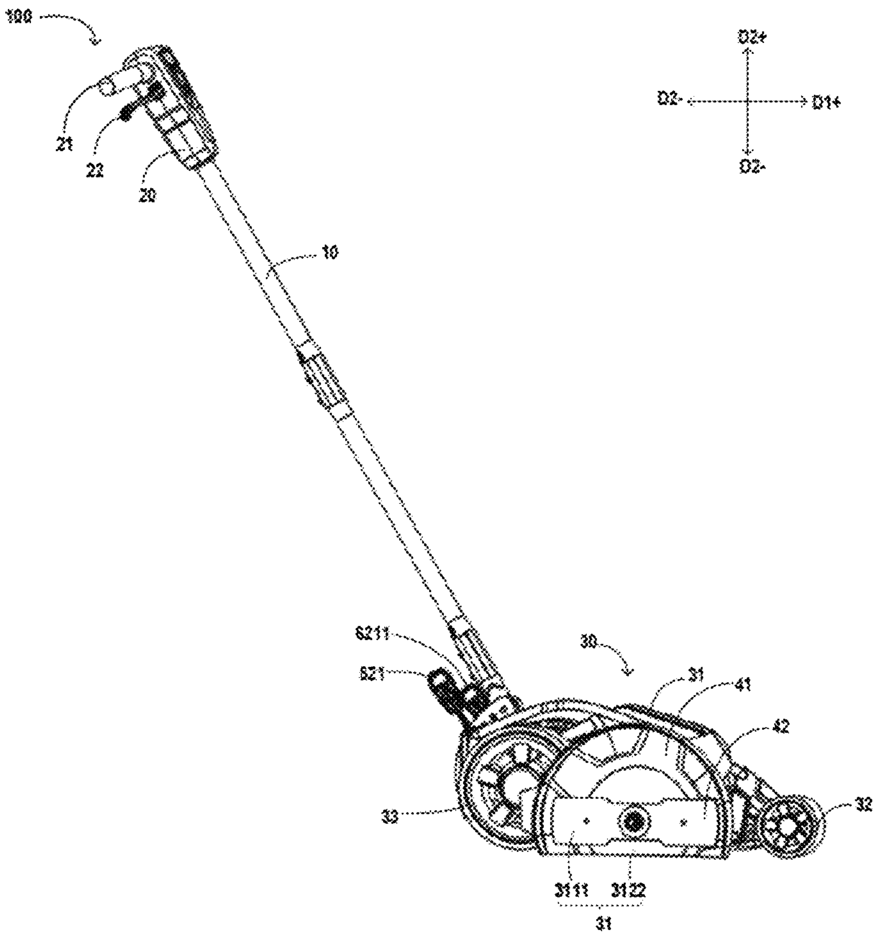
FIG. 1 and FIG. 2 are respectively a right side view and a left side view of an electric tool according to a preferred embodiment of the present invention.

Specific embodiments of the present invention are now described in detail by referring to the drawings. The embodiments described herein are merely preferred embodiments of the present invention, and, on the basis of these preferred embodiments, those of ordinary skill in the art will be able to conceive of other ways in which the present invention is implementable, all of which likewise fall within the scope of the present invention.

FIG. 1-FIG. 22B are preferred embodiments of electric tools according to the present invention, wherein FIG. 1 to FIG. 8 are a configuration according to one aspect of the present invention, FIG. 9 to FIG. 15 are a configuration according to another aspect of the present invention, and FIG. 16-FIG. 22B are a configuration according to yet another aspect of the present invention. An electric tool of the present invention may be a gardening tool, for example, an edger or mower. It must first be explained that directional and positional terms in the present invention should be understood as meaning relative directions and positions rather than absolute directions and positions. The directional and positional terms used herein may be explained with reference to the exemplary structures shown in FIG. 1-FIG. 22B. For example, unless otherwise specified, the terms "axial" and "axial direction" as used herein refer to the direction along the axis of the transmission gear; "radial" and "circumferential" refer to the radial and circumferential directions of the axis direction of the transmission gear; "radially inwards" and "radially inside" refer to the direction along the radial direction towards the axis of the transmission gear; and "radially outwards" and "radially outside" refer to the direction along the radial direction away from the axis of the transmission gear.

In FIG. 1, the forward direction is indicated by D1+ and the backward direction is indicated by D1−; "upper" and "lower" may be understood as relative directions when the electric tool is placed on a horizontal plane during operation, wherein, in FIG. 1A and FIG. 2, the upward direction or the direction towards the top side is indicated by D2+, and the downward direction or the direction towards the bottom side is indicated by D2−; "left" and "right" may be understood as relative directions during observation from the rear of the electric tool from an operator's perspective, wherein, for example, the dropping wheel is mounted on the left side of the body, the support wheel and front wheel are mounted on the right side of the body, and, in FIG. 16, the left direction is indicated by D3−, while the right direction is indicated by D3+. Indeed, each wheel, rather than being limited to the arrangement on the left and right as described above, may also be arranged conversely.

Figure 2:
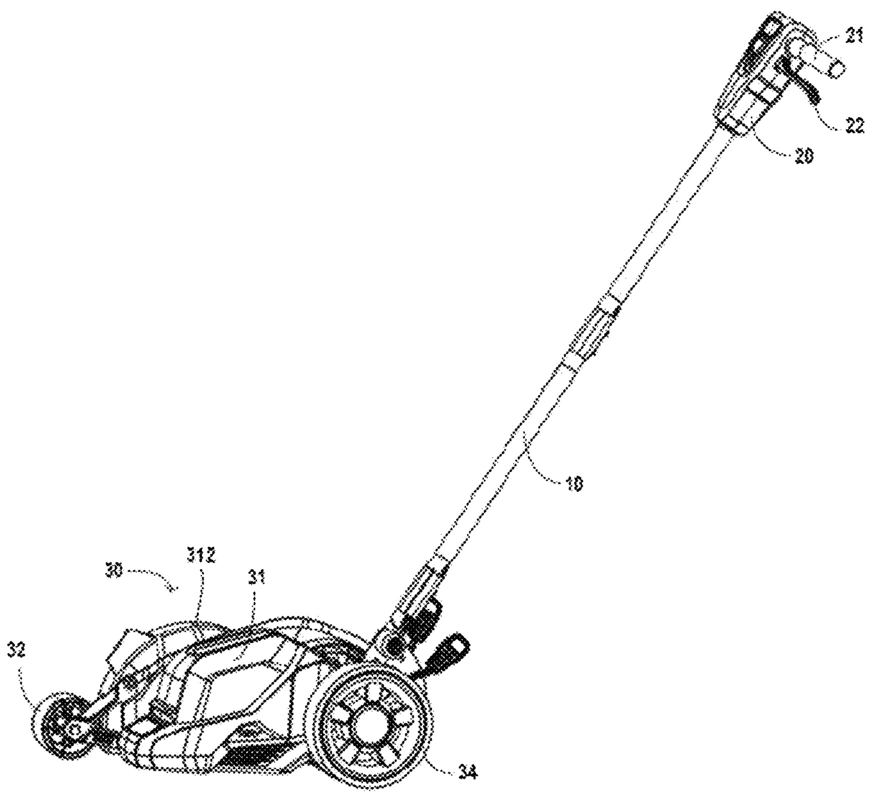

Firstly, referring to FIG. 1 and FIG. 2, in some embodiments, the electric tool 100 comprises a body 30, a first rear wheel 34 located on the left side of the body 30, a front wheel 32 located on the right side of the body 30, a second rear wheel 33, and an operating component 42. The second rear wheel 33 and the first rear wheel 34 are symmetrically arranged at a rear position of the body 30. The operating component 42 is located substantially between the front wheel 32 and the second rear wheel 33, the operating component 42 being, for example, a rotatable blade 3111, and the electric tool 100 is provided with a protective cover 41 that at least partially accommodates the operating component 42, the protective cover 41 being, for example, configured as a semi-circular protective cover 3122.

The electric tool 100 further comprises a control lever 10, the control lever 10 extending diagonally backwards from a rear position of the body 30 for an operator to manipulate. The length of the control lever 10 may be several times the height of the body 30, and a user can control the electric tool 100 by controlling the top of the control lever 10. For example, the top of the control lever 10 is provided with an interactive structure 20, the interactive structure 20 comprising a handle 21 and a brake lever 22, and a user can manipulate the handle 21, the brake lever 22, etc., to steer and stop the electric tool 100. Additional interactive components with other control functions may be arranged at the top of the control lever 10. When the electric tool is a mower, it may further comprise another front wheel located on the left side of the body.

The body 30 of the electric tool 100 is internally provided with a motor 34 (see FIG. 4A), and the electric tool 100 further comprises a transmission mechanism motionally connected to the motor 34 and the operating component 42, respectively, to transmit the output of the motor 34 to the operating component 42. The electric tool further comprises a stop mechanism 60 for locking the transmission mechanism (see FIG. 4A).

Figure 3:
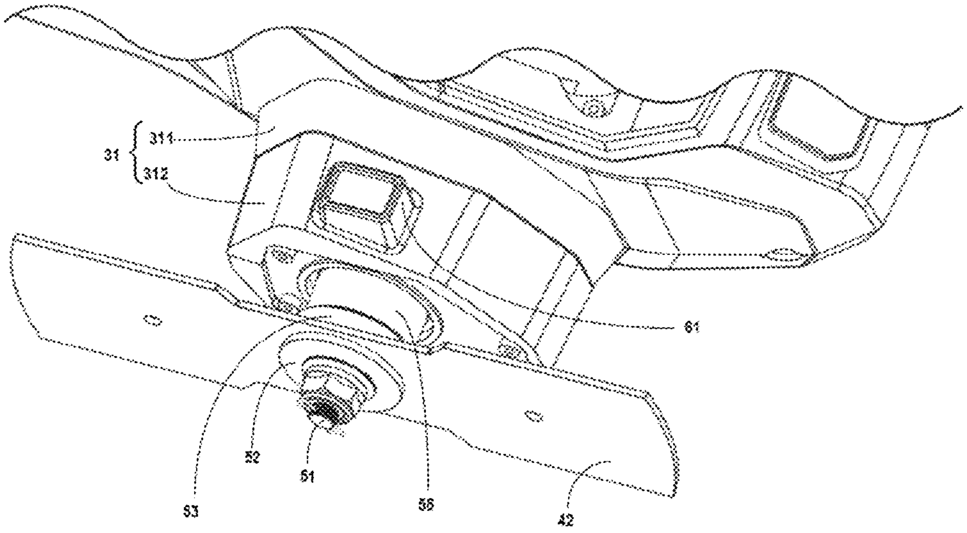
FIG. 3 is a three-dimensional view from the top view of the operating component in FIG. 1, where the protective cover and most of the structure of the body are omitted.

For example, referring to FIG. 3, the housing 31 of the body 30 comprises a main housing portion 311 and an additional housing portion 312 protruding from a side of the main housing portion 311, the additional housing portion 312 being configured to partially accommodate the transmission mechanism. The transmission mechanism comprises a transmission gear 56 (see FIG. 5), an output shaft 51, as well as a washer 53, a shim 52, and other structures assembled at the end of the output shaft 51, the transmission gear 56 being accommodated in the assembly shell 55 of the transmission mechanism. The output shaft 51 also runs through the operating component 42, and the operating component 42 is sandwiched between the washer 53 and the shim 52, wherein, for example, the washer 53 is located on an axial inner side of the operating component 42 (for example, the side facing the body 30), and the shim 52 is located on an axial outer side of the operating component 42 (for example, the side facing away from the body 30). The washer 53 may be fixed integrally with the operating component 42, and the inner circumference of the washer 53 is also fixed integrally with the outer circumference of the output shaft 51, so that the output shaft 51 drives the operating component 42 to rotate. The shim 52 is configured to further press the operating component 42 and the washer 53 together. The stop mechanism comprises an operating member 61 partially protruding from the housing 31, the operating member 61 being operable by a user to lock the transmission mechanism.

Figure 4A:
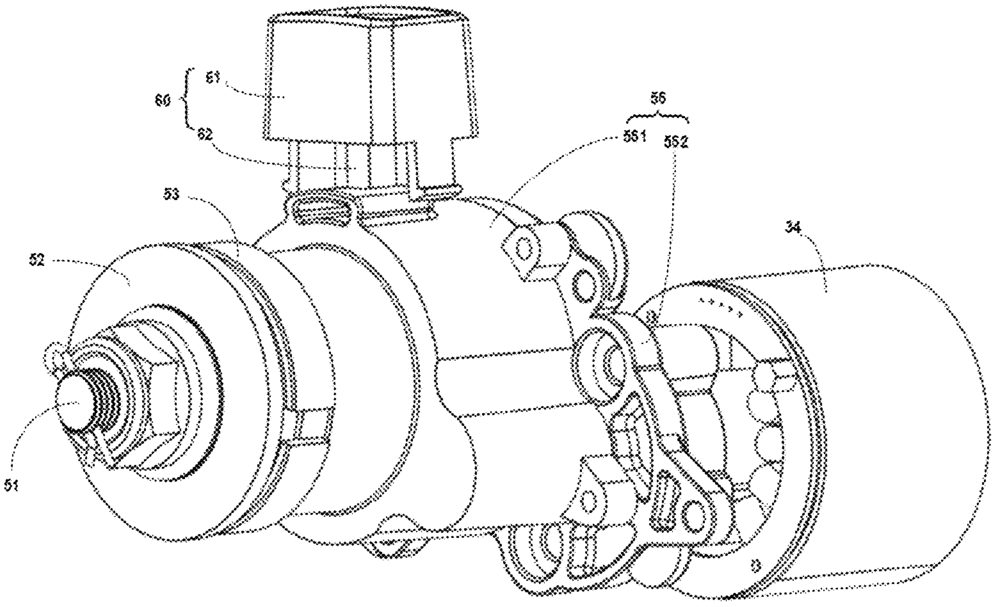
FIG. 4A is a schematic diagram of FIG. 3 with the housing and operating component removed, which shows the motor of the electric tool.
Figure 4B:
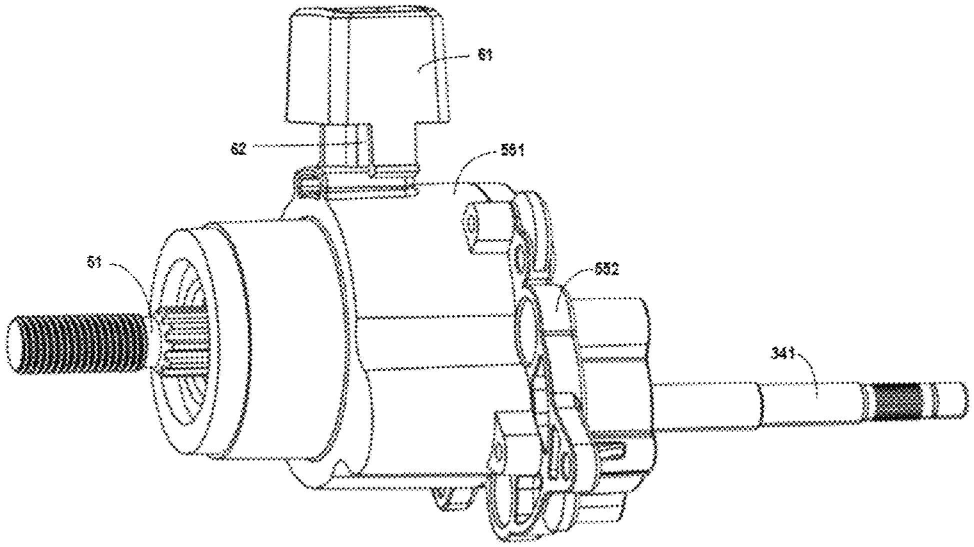
FIG. 4B is a further simplified schematic diagram of FIG. 4A, where only the assembly shell, the motor shaft, and the output shaft of the electric tool, as well as the stop mechanism are retained.
Figure 5:
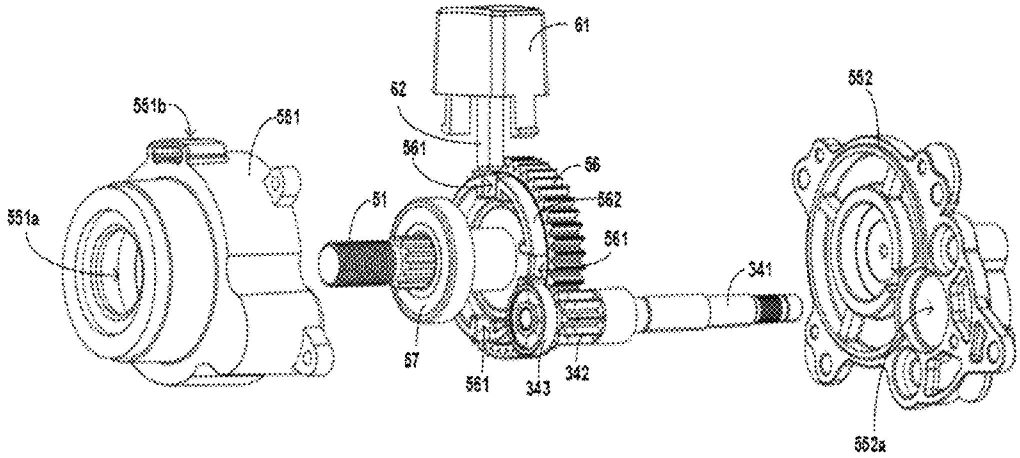
FIG. 5 is an exploded schematic diagram of FIG. 4B, which shows the internal structure of the assembly shell.

FIG. 4A-FIG. 5 show the connection relationship among the motor 34, the transmission mechanism, and the stop mechanism 60. Overall, the assembly shell 55 of the transmission mechanism is positioned at the output end of the motor 34 and comprises a shell body 551 and an assembly bracket 552 that are axially butt-jointed, the assembly bracket 552 being located on the side of the shell body 551 near the body 30.

The motor shaft 341 extends from the motor shaft hole 552*a* on the assembly bracket 552 into the assembly shell 55 and engage with the transmission gear 56. In some embodiments, a driving gear 342 is coaxially fixed at an output position near the end of the motor shaft 341, and the driving gear 342 externally engages with the driving gear 56. The output shaft 51 and the transmission gear 56 are fixedly connected coaxially and extend beyond the assembly shell 55 through the output shaft hole 551*a* on the shell body 551. Since the driving gear 342 and the transmission gear 56 externally engage, the axes of the motor shaft 341 and output shaft 51 are parallel to each other. Bearings 57 are mounted on the output shaft 51, and bearings 343 are mounted at the end of the motor shaft 341 to support it in the housing. Specifically, the diameter of the transmission gear 56 is larger than the diameter of the driving gear 342, so that the transmission mechanism performs a deceleration function.

It is clear from FIG. 5 that the assembly shell 55 is mainly intended to accommodate the transmission gear 56 and the driving gear 342. Preferably, the inner contour of the assembly shell 55 fits the outer contour of the driving gear 342 and the transmission gear 56. For example, as shown in the drawing, the shell body 551 and the assembly bracket 552 each have a large circumferential portion corresponding to the transmission gear 56 and a small circumferential portion corresponding to the driving gear 342. Preferably, the shell body 551 is an integrated component, and the assembly bracket 552 is also an integrated component.

Again referring to FIG. 4A-FIG. 5, the operating component 61 of the stop mechanism 60 is located on an outer side of the assembly shell 55, for example, on the top side of the assembly shell 55. The stop mechanism 60 is further provided with a protrusion, preferably a pin 62, wherein the pin 62 extends from the operating member 61 through a pin hole 551*b* on the top side of the shell body 551 into the assembly shell 55 and extends towards the transmission gear 56. The pin 62 is mainly configured to engage with the transmission gear 56. An arresting disc 560 is integrated on the transmission gear 56, the arresting disc 560 comprising a groove 561, a curved segment 562, and an extension segment 563, as described below. Specifically, a groove 561 is formed on an end face of the transmission gear 56, and, when a user presses the operating component 61, the pin 62 may extend into the groove 561 to lock the transmission gear 56, that is, locking the output shaft 51 of the electric tool.

Figure 6:
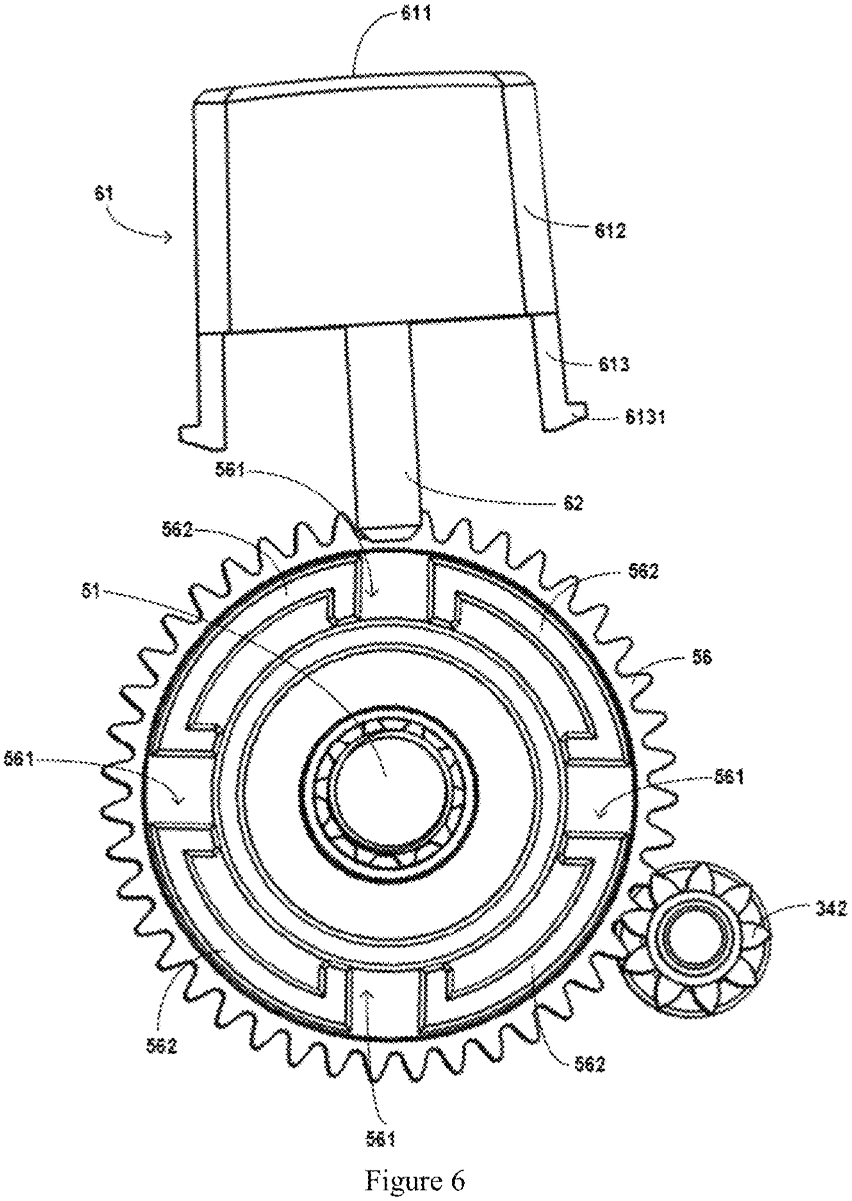
FIG. 6 is a schematic diagram of the driving gear, transmission gear, and stop mechanism in FIG. 5 in an assembled state observed along the axis direction of the transmission gear.
Figure 7:
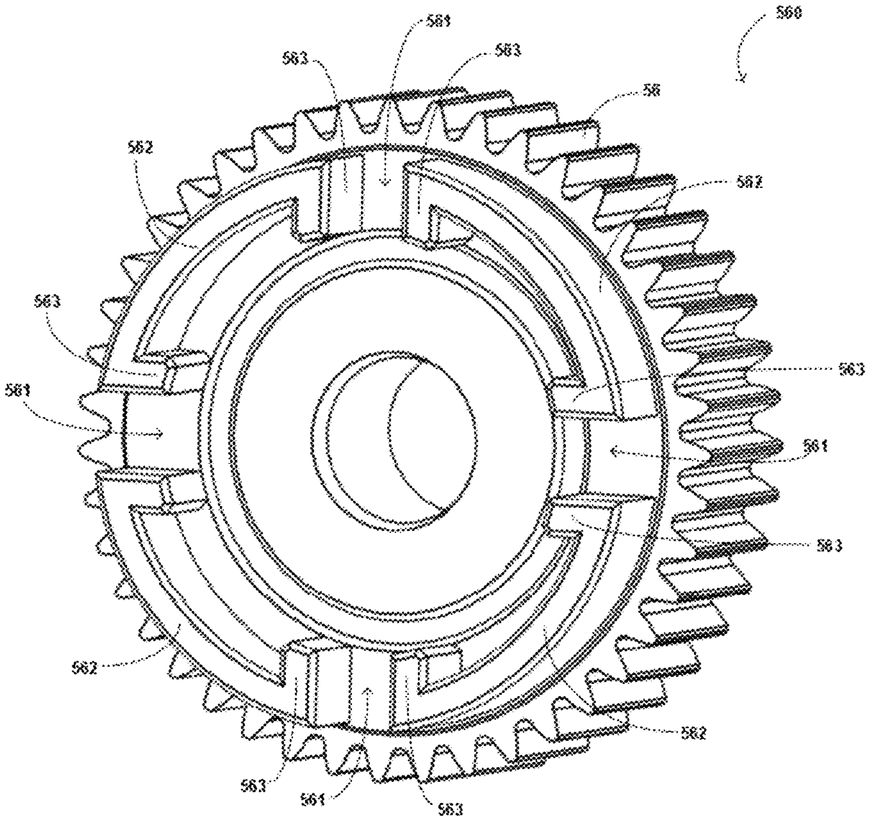
FIG. 7 is a separate three-dimensional schematic diagram of the transmission gear in FIG. 5.

A specific structural form of the transmission gear 56 is shown in FIG. 5-FIG. 7. Referring to FIG. 5-FIG. 7, the groove 561 is formed on an end face of the transmission gear 56 away from the body 30, and the groove 561 extends radially along the transmission gear 56 and has a radially outward opening. Further, a plurality of protruding curved segments 562 are provided on an end face of the transmission gear 56, and the groove 561 is defined by adjacent curved segments 562. For example, each curved segment 562 circumferentially extends on an end face of the transmission gear 56, and the spacing between adjacent curved segments 562 forms the groove 561. Specifically, the number of curved segments 562 is four. The lengths of each curved segment 562 are equal, and the spacing between adjacent curved segments 562 is also equal. With such arrangement, the number of grooves 561 is also four, and the four grooves 561 are evenly spaced on an end face of the transmission gear 56. More preferably, a plurality of curved segments 562 extend along the circumferential edges of the end face to form the grooves 561 at the edges of the end face.

Further, referring to FIG. 7, each end of each curved segment 562 is formed with an extension segment 563 that extends radially inwards relative to the curved segment, opposite lateral faces of opposite extension segments 563 of adjacent curved segments 562 are parallel to each other, jointly defining the groove 561, wherein, with such an arrangement, the radial size of the wall of the groove 561 increases, so that the pin 62 may be inserted radially into the groove 561 more stably. As shown in FIG. 6 and FIG. 7, the length of the curved segment 562 may be ⅙-⅕ of the circumference of the end face of the transmission gear 56, and the length of the extension segment 563 may be ⅕-⅓ of the radius of the transmission gear 56, for example.

Figure 8:
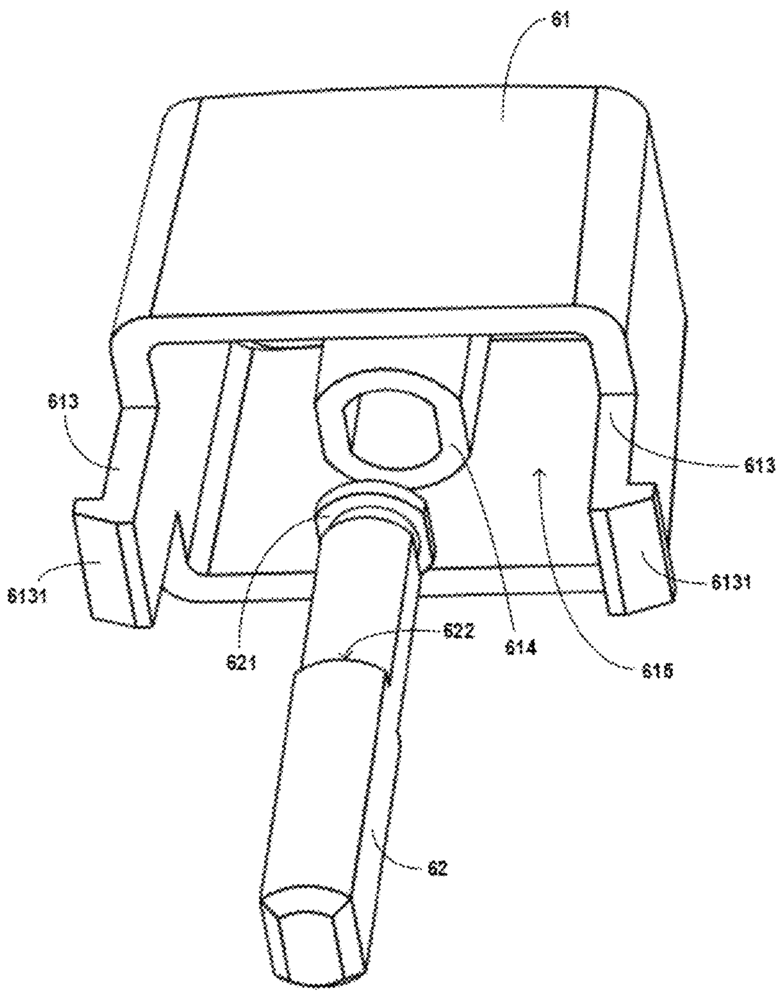
FIG. 8 is a three-dimensional schematic diagram of the stop mechanism in FIG. 7 in a disassembled state.
Figure 9:
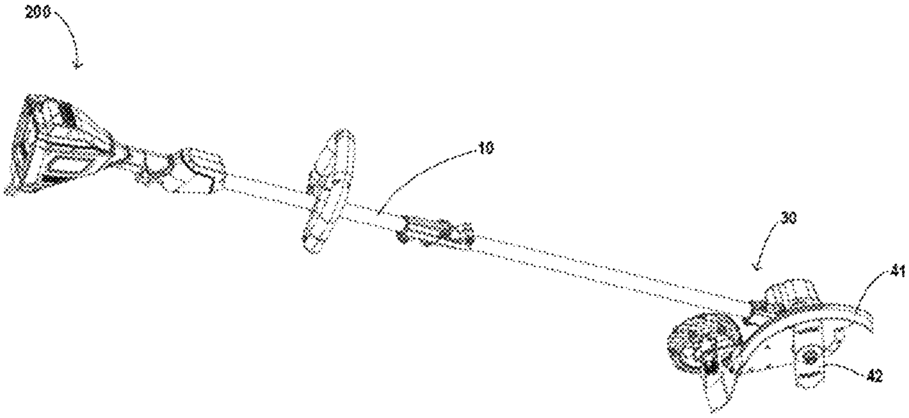
FIG. 9 is a three-dimensional view of an electric tool according to another preferred embodiment of the present invention.

A specific structural form of the stop mechanism 60 is shown in FIG. 5, FIG. 6, and FIG. 8. Referring to FIG. 5, FIG. 6, and FIG. 8, the operating component 61 engages with the end of the pin 62 away from the groove 561, wherein, in the embodiment shown in the drawings, the operating component 61 engages with the top of the pin 62. Specifically, the operating component 61, for example, comprises an end wall 611 and a continuous side wall 612 connected to the end wall 611, wherein the end wall 611 and the side wall 612 jointly define an accommodating space 615 facing the opening of the transmission gear 56, the accommodating space 615 having a receiving sleeve 614 connected to the end wall 611, the pin 62 being inserted into the receiving sleeve 614. The top of the pin 62, for example, has a circular flange 621, and, when the top of the pin 62 enters the receiving sleeve 614, the circular flange 621 engages with a corresponding buckle portion inside the receiving sleeve 614. Further, a shoulder portion 622 is further provided at a middle position of the pin 62, the shoulder portion 622 being capable of resting against the bottom side of the receiving sleeve 614.

Again referring to FIG. 8, in some embodiments, a pair of opposite side faces of the pin 62 are planes 623, and the side face connecting this pair of planes 623 is a protruding cambered surface 624. In the end face view of the receiving sleeve 614 shown in FIG. 8, it is clear that the inner side of the receiving sleeve 614 fits the shape of the pin 62. Since the surface of contact between the receiving sleeve 614 and the pin 62 comprises a plane, relative torsion is unlikely to occur between the pin 62 and the operating member 61. For example, when the pin 62 is inserted into the groove 561 of the transmission gear 56 to stop the transmission gear 56, the transmission gear 56 applies a reaction force on the pin 62, and the vibration and other effects generated by the reaction force will be transmitted to the operating component 61, wherein, since the surface of contact between the receiving sleeve 614 of the operating component 61 and the pin 62 comprises a planar structure, the pin 62 can hardly have any rotational displacement relative to the receiving sleeve 62 even when vibration occurs between the pin 62 and the receiving sleeve 614. In another aspect, the arrangement of such a relatively stable contact surface can also retard the relative vibration between the pin 62 and the receiving sleeve 614, thus protecting the pin 62.

Preferably, the operating component 61 further comprises at least two clasp feet 613 that extend from the side wall 612 away from the end wall 611, and the ends of the clasp feet 613 are snap-fitted to the housing 31 of the body 30 to prevent the operating component 61 from separating from the housing 31. For example, two clasp feet 613 are provided, and the two clasp feet 613 are arranged relative to the pin 62, wherein the bottom of each clasp feet 613 is provided with a buckle hook 6131, wherein the buckle hook 6131 may be buckled to the inner surface of the wall of the housing 31 to limit detachment of the operating component 61 from the housing 31.

In some embodiments, the stop mechanism 60 may further comprise an elastic member, wherein the elastic member is connected to the operating member 61 and/or the pin 62 and is configured to accumulate force when the pin 62 is inserted into the groove 561, thus continuously offsetting the pin 62 in the direction of detaching it from the groove 561. For example, the elastic member may be sleeved on the pin 62, or the elastic member may be partially located in the accommodating space 615 and independent of the pin 62, with one end thereof resting against the end wall 611 of the operating member 61 and the other end thereof resting against the assembly shell 55. During replacement of the operating component 42, preferably a user keeps pressing the operating component 61, and the operating component 61, once the external force applied thereto is lost, automatically returns to the non-stop position detached from the transmission gear 56 under the action of the elastic component, which prevents possible damage to the transmission mechanism when a user starts the electric tool 100 before releasing the stop mechanism 60.

The structural form of the transmission gear in the above embodiment is only illustrative, and it may be understood that the transmission gear may have some modifications. For example, a groove may be positioned on an end face of the transmission gear facing the body; a groove can have an axial opening, and correspondingly, a pin can enter the groove along the axial direction to lock the transmission gear; a groove and an curved segment may be arranged not necessarily near the edge of an end face, but may be arranged near the centre of an end face; in the case where a plurality of grooves are provided, the plurality of grooves may be arranged circumferentially and unevenly spaced; an extension segment may extend radially outwards from an curved segment; an end face of the transmission gear may be provided with only curved segments and no extension segments, and opposite ends of adjacent curved segments completely form the wall of a groove; a groove may also be formed in another manner, wherein, for example, the transmission gear may comprise a gear portion and a protrusion that are fitted together along the axial direction, the protrusion is a substantially circular plate-shaped structure, and a recessed structure may be provided on the protrusion to form a groove.

The structural form of the stop mechanism in the above embodiment is only illustrative, and it may be understood that the stop mechanism may have some modifications. For example, the operating component may be a simple flat button; the operating component and the pin may be formed integrally; the stop mechanism may comprise some fixing structures, so that when the pin enters a groove of the transmission gear, the fixing structures fix the pin there, eliminating the need for a user to keep pressing the pin; the operating component may protrude from the bottom surface of the housing; the operating component may also protrude from the side facing the operating component of the housing and enter the groove axially, wherein, in such an embodiment, the groove may have an axial opening; the stop mechanism may be provided with no elastic components, and a pin is manually inserted into and removed from a groove by an operator; the protrusion of the stop mechanism may not necessarily be a pin, and may also be a block-like protrusion, for example.

The transmission mechanism in the above embodiment is only exemplary, and the transmission mechanism may have some modifications. For example, the diameter of the transmission gear may be equal to or smaller than the diameter of the driving gear; the transmission mechanism may further comprise a second transmission gear, which can engage with the transmission gear described earlier, and the output shaft of the electric tool is fixed to the second transmission gear; the transmission gear may further comprise three or more transmission gears, which sequentially engage (by internal engagement or engagement), with a groove as described earlier arranged on one of the transmission gears, and the pin of the stop mechanism is insertable into that groove.

An electric tool 200 according to a second embodiment of the present invention, which is an edger, for example, a bar edger, will be described below in conjunction with FIG. 9 to FIG. 15. Similar to the electric tool shown in FIG. 1 to FIG. 8, the electric tool comprises a body 30, a wheel located at the rear of the body 30, and an operating component 42. The operating component 42 is located on a side face of the body 30, wherein the operating component 42, for example, is a rotatable blade, and the electric tool 200 is provided with a protective cover 41 that at least partially accommodates the operating component 42. In the following description, emphasis will be placed on describing relevant components, components that are the same as or similar to those of the first embodiment will be marked with the same reference signs, and descriptions thereof in the first embodiment are also applicable to the second embodiment and no similar details will be provided again herein. For example, the electric tool 200 also comprises a control lever 10, an interactive structure, a handle, and a brake lever.

Similar to the first embodiment, the body 30 of the electric tool 200 is provided with a motor 34, and the motor 34 is accommodated in the housing 31 of the body 30. Unlike the first embodiment, this embodiment does not comprise a transmission gear, but rather a motor shaft 341 is directly connected to the operating component 42 to transmit the output of the motor 34 to the operating component 42, which means that the motor shaft 341 is also the output shaft 51 of the electric tool. Similarly, the end of the output shaft 51 is provided with a washer 53, a shim 52, and other structures, the output shaft 51 also runs through the operating component 42, and the operating component 42 is sandwiched between the washer 53 and the shim 52, wherein the above descriptions of the output shaft 51, washer 53, shim 52, etc., are also applicable to this embodiment and no similar details will be provided again herein.

Figure 11:
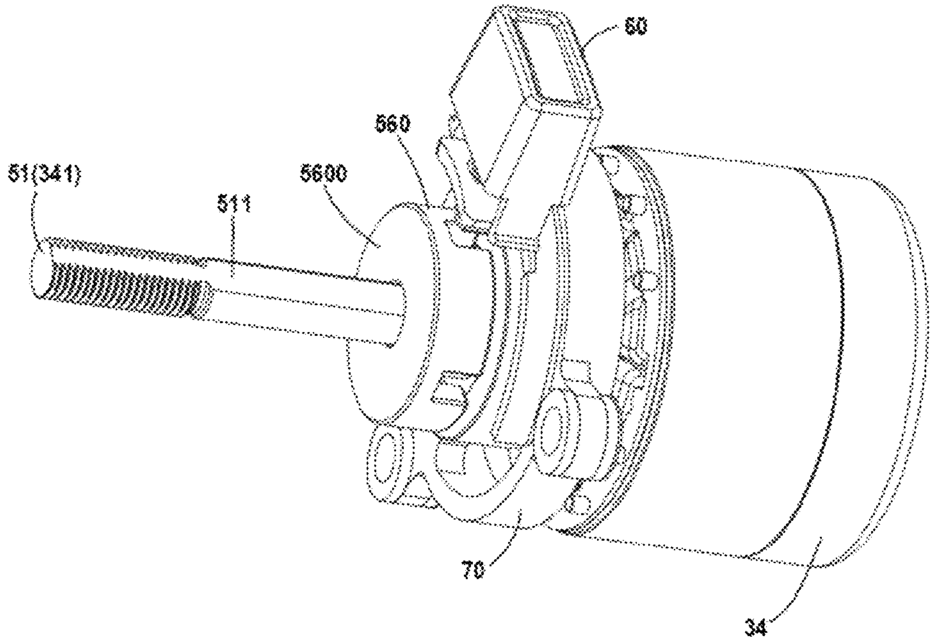
FIG. 11 is a schematic diagram of FIG. 10 with the housing and operating component removed, which shows the motor, output shaft, arresting disc, and stop mechanism of the electric tool.
Figure 12:
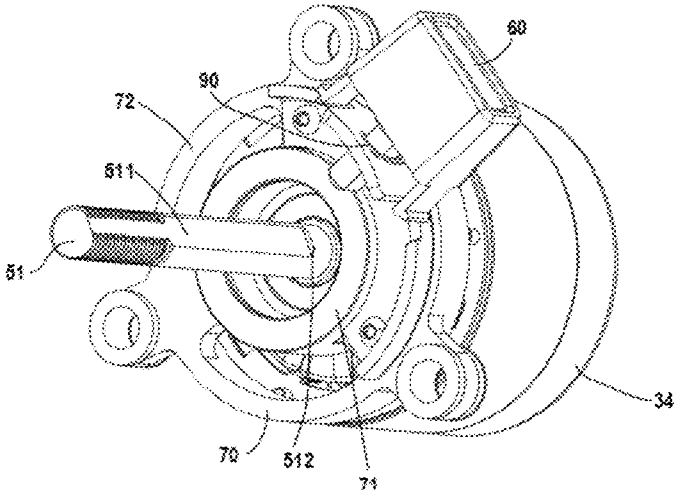
FIG. 12 is a schematic diagram of FIG. 11 with the arresting disc removed, which shows the connection between the output shaft and the stop mechanism.
Figure 13:
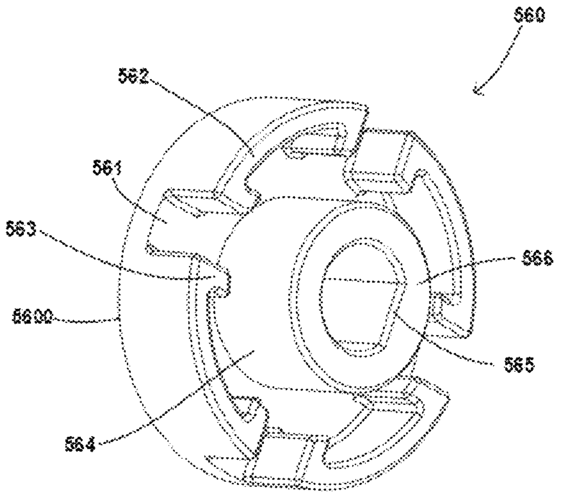
FIG. 13 is a separate three-dimensional schematic diagram of the arresting disc.
Figure 14:
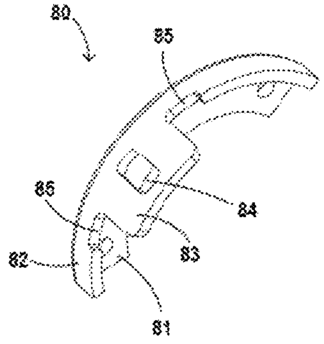
FIG. 14 is a separate three-dimensional schematic diagram of the mounting support.
Figure 15:
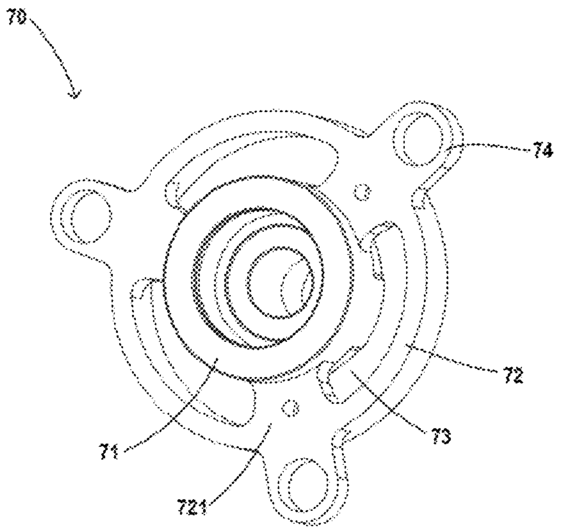
FIG. 15 is a separate three-dimensional schematic diagram of the framework.

The arresting disc 560 is directly fixed on the output shaft 51. Specifically, as shown in FIG. 11 and FIG. 13, one side of the output shaft 51 (that is, the motor shaft 341) is provided with a platform portion 511 that is inwardly recessed from the outer circumference of the output shaft, a shaft shoulder 512 that is inwardly recessed from the outer circumference of the output shaft is provided at one end near the motor, and the platform portion 511 extends from the shaft shoulder 512 to the other end (that is, the end at which the washer 53 and the shim 52 are mounted) of the output shaft 51. The height of the shaft shoulder 512 and the extension length, width, and other dimensions of the platform portion 511 are not subject to specific restrictions and may be flexibly arranged according to specific applications. For example, the platform portion 511, rather than necessarily extending through the entire output shaft 51 to the other end, may extend by only a certain length from the shaft shoulder 512 towards the other end, allowing another attachment, for example, an arresting disc 560, to be mounted. The platform portion 511 may be machined, for example, by milling on the output shaft 51 or by another suitable means. The platform portion 511 and the shaft shoulder 512 are configured to mount, position, and fix the arresting disc 560.

Correspondingly, the centre of the arresting disc 560 is provided with a boss 564 protruding from a base 5600 of the arresting disc, and the base 5600 of the arresting disc is a disc-shaped bottom plate, for example. The centre of the boss 564 is provided with a through-hole that runs through the base 5600 of the arresting disc, and is mounted thereon through the output shaft 51. Therefore, the shape and size of the through-hole correspond to the shape and size of the output shaft 51. Corresponding to the recessed platform portion 511 of the output shaft 51, the central through-hole of the arresting disc 560 is not a complete circular shape, but a flat portion 565 is arranged on the inner circumference of the through-hole, so that the contour and cross section of the central through-hole of the arresting disc 560 are smaller than a complete circular shape. In addition, the width and other dimensions of the flat portion correspond to the platform portion 511. The end of the boss 564 opposite the base of the arresting disc is provided with an end face 566, wherein, when the arresting disc 560 is mounted onto the output shaft 51, the end face 566 rests against the shaft shoulder 512 of the output shaft 51, and at the same time, the flat portion 565 rests against the platform portion 511. By the arrangement of the shaft shoulder 512, platform portion 511, and flat portion 566, the arresting disc 560 may be axially fixed and circumferentially stopped on the output shaft 51, allowing the arresting disc to rotate together with the output shaft.

In addition, similar to the arresting disc of the first embodiment, the arresting disc 560 has a groove 561, a plurality of protruding curved segments 562 and extension segments 563 provided on the base 5600 of the arresting disc. The difference lies in that in the first embodiment, the groove 561 is formed on the end face of the transmission gear 56 away from the body 30, and the curved segment 562 and extension segment 563 protrude and extend from the end face of the transmission gear 56 away from the body 30, while in this embodiment, they are formed on the base 5600 of the arresting disc, so the base 5600 of the arresting disc in this embodiment is equivalent to the transmission gear 56 or the end face of the transmission gear 56 in the first embodiment. Further, the descriptions of the end face of the transmission gear (equivalent to the base 5600 of the arresting disc), groove 561, curved segment 562, and extension segment 563 in the first embodiment (such as their quantities, sizes, arrangement, and distance relationships) also apply to this embodiment and no similar details will be provided again herein. Similar to the boss 564, the curved segment 562 may protrude from the base 600 to a height flush with the boss 564, so that the end face 566 of the boss is coplanar with the curved segment 562, so it may be said that the end face of the arresting disc 560 rests against the shaft shoulder 512.

Figure 10:
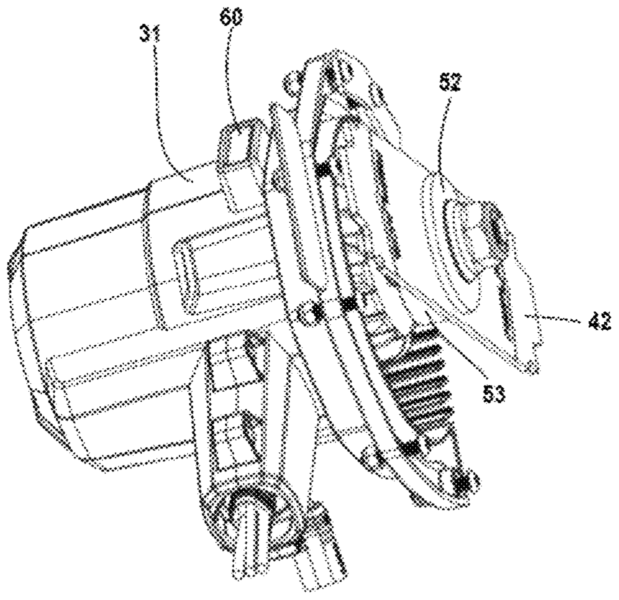
FIG. 10 is a detailed three-dimensional view of the operating component shown in FIG. 9.

It should be pointed out that one end of the arresting disc 560 rests against the shaft shoulder 512, while the other end thereof may be fixed by any other suitable means. For example, as shown in FIG. 10, an electric fan is further provided between the arresting disc 560 and the operating component 42, so the arresting disc may be axially fixed on the output shaft between the motor and the operating component, or various sleeves and other components may be alternatively or additionally arranged around the arresting disc to allow axial fixation of the arresting disc.

The stop mechanism 60 will be described below, which has the same structural compositions as those of the first embodiment, so the above description of the stop mechanism 60 is also applicable to this embodiment, with the difference being the position and structure of arrangement of the stop mechanism 60.

As this embodiment does not comprise a transmission mechanism, the stop mechanism 60 is directly mounted on the housing 31. Specifically, a frame 70 is sleeved on the output shaft 51, wherein the frame 70 is mounted on the housing 31, being in a circular shape overall and comprising a central base 71, the central base 71 being provided with a through-hole in the centre and sleeved on the output shaft 51. At least two curved arms 72 are arranged at intervals on the periphery of the central base 71, and the curved arms 72 are spaced evenly apart through an equal number of connecting arms 721, forming a circle and respectively connected to the central base 71 through these connecting arms 721. The drawing exemplarily shows 3 curved arms 72, and the 3 curved arms are spaced evenly apart through 3 connecting arms 721, forming a circle and respectively connected to the central base 71 through 3 connecting arms 721. A curved hole 73 is formed between each curved arm 72 and the central base, as well as between two connecting arms 721, and the mounting bracket 80 described below is mounted between two connecting arms 721 and covers the curved hole 73. 3 curved holes 73 are spaced evenly apart circumferentially around the centre base. 3 lugs 74, for example, are arranged on the outer circumference of the curved arm 72, thereby mounting the frame 70 onto the housing 31.

The mounting support 80 is overall curved and arranged on the housing 31, and comprises a baseplate 81 and a side plate 82 protruding from the edge of the baseplate, wherein the shape of the baseplate corresponds to the curved hole 73 and covers the curved hole 73 in a mounted state. The circumferential centre of the side plate 82 is provided with a vane 83, and the vane 83 protrudes the furthest from the baseplate 81 compared with other parts of the side plate. The centre of the vane 83 is provided with an opening 84, and the shape of the opening 84 corresponds to that of the pin 62, so that the pin 62 runs through the opening into the groove 561 of the arresting disc 560. The mounting support 80 is mounted at the corresponding position above the arresting disc 560. In addition, at least two slots 85 are provided around the opening 84 of the vane on the edge of the side plate 82, and at least two clasp feet 613 of the operating component 61 may be inserted into and run through the slots 85. For example, the drawing shows two slots 85 arranged on both sides of the opening 84 of the vane, and two clasp feet 613 of the operating component 61 may be inserted into and run through the slots. The positions, shapes, and dimensions of the vane 83, opening 84, and slot 85 correspond to those of the operating component 61, clasp feet 613, and pin 62, respectively. The mounting support 80 may be mounted, for example, by screws, onto the frame 70 and then onto the housing 31, or the mounting support 80 may be directly mounted onto the housing 31, without being mounted onto the frame 70. The structures and shapes of the frame 70 and of the mounting support 80 are only examples, and the present invention, rather than being limited thereto, may include various variants and modifications, as long as they allow the stop mechanism to be mounted on the housing 31.

In addition, the elastic member 90 (for example, a spring) is mounted between the vane 83 and the stop mechanism 60, so that when the pin 62 is inserted into the groove 561, force is accumulated to continuously offset the pin 62 towards the direction of detaching it from the groove 561. As mentioned above, for example, the elastic member may be sleeved on the pin 62, or the elastic member may be partially located within the accommodating space 615 and independent of the pin 62, with one end thereof resting against the end wall 611 of the operating member 61 and the other end thereof resting against the vane 83. Holes are further provided at corresponding positions in the housing for the operating component 61 to pass through, therefore, under normal conditions, the operating component 61 of the stop mechanism 60 is located inside the housing 31 and partially exposed from the housing, while the buckle hook 6131 at the bottom of the clasp foot 613 may be buckled to the inner side of the wall of the housing 31 to limit detachment of the operating component 61 relative to the housing 31. When the operating component 42 needs to be replaced, a user presses the operating component 61 to overcome the elastic force of the elastic component 90, so that the pin 62 moves downwards and enters the groove 561 of the arresting disc through the opening 84, thereby locking the arresting disc and output shaft; when the replacement is completed, the user stops pressing the operating component, and the operating component moves upwards to its original position under the elastic restoring force of the elastic component 90; during this process, the pin 613 moves up and down through the slot 85, and when the operating component 61 moves to its original position, the buckle hook 6131 at the bottom of the pin 613 is buckled to the inner side of the wall of the housing 31 to limit detachment of the operating component 61 relative to the housing 31.

Overall, in the first embodiment, the arresting disc 560 is integrally formed on the end face of the transmission gear 56, the base 5600 of the arresting disc is the end face of the transmission gear 56, and the arresting disc does not comprise a boss 564; in the second embodiment, no transmission mechanism or transmission gear is included, but the arresting disc is separately arranged on the output shaft 51 and fixed to the output shaft through the flat portion 565 of the central through-hole thereof, the platform portion 511 of the output shaft, and the shaft shoulder 512; the stop mechanisms 60 in the two embodiments are identical. Therefore, relevant descriptions of the arresting disc 560 and of the stop mechanism 60 in the first embodiment are also applicable to the second embodiment, and no similar details will be provided again herein. The concepts of these two embodiments (such as the arresting disc 560 and the stop mechanism 60) are modifiable and alterable according to specific applications without departing from the essence thereof, and are applicable to various types of electric tools, all of which fall within the scope of protection of the present invention.

The electric tool 100 is further provided with a body lifting mechanism, wherein the body lifting mechanism is configured to adjust the height of the body 30 of the electric tool relative to the operating plane. A preferred arrangement of the body lifting mechanism will be described below. It should be noted that the first rear wheel 34 of the electric tool 100 is also referred to as the dropping wheel 6116, and the second rear wheel 33 is also referred to as the support wheel 5115. During operation, the bottom of the support wheel 5115 usually contacts the operating plane, so the body lifting mechanism can change the height of the body 30 relative to the ground by adjusting the height of the body 30 relative to the support wheel 5115.

Figure 16:
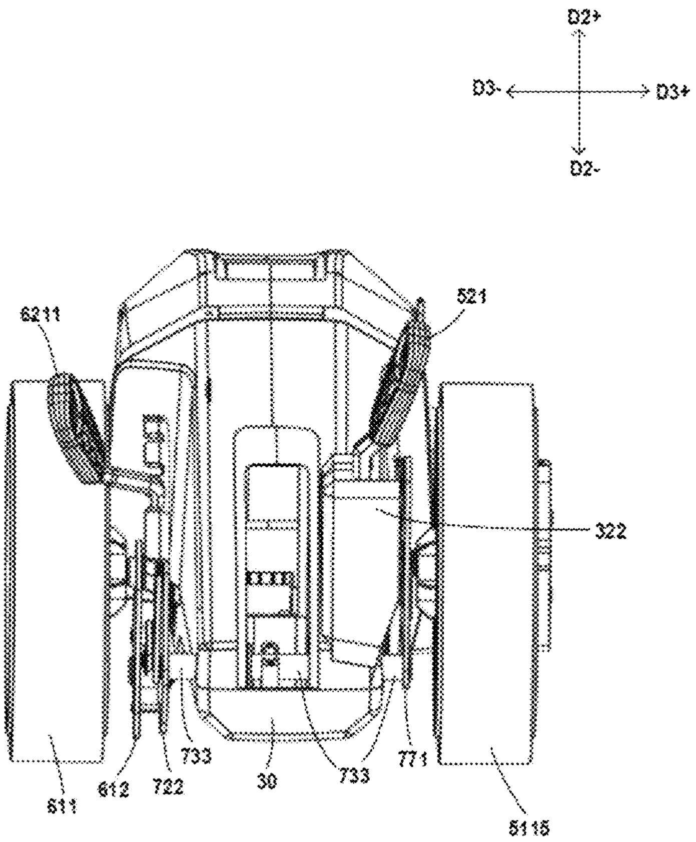
FIG. 16 is a rear view of the electric tool shown in FIG. 1-FIG. 2, where the operating lever of the electric tool is omitted.

The electric tool 100 further comprises a dropping wheel lifting mechanism for adjusting the height of the dropping wheel 6116 relative to the body 30. The body lifting mechanism and the dropping wheel lifting mechanism are operable independently of each other. Referring to FIG. 1A, FIG. 1B, and FIG. 16, the body lifting mechanism comprises, for example, a body lifting control handle 521 arranged between the body 30 and the support wheel 5115, and the dropping wheel lifting mechanism comprises, for example, a dropping wheel lifting control handle 6211 arranged between the body 30 and the support wheel 5115. The body lifting control handle 521 and the dropping wheel lifting control handle 6211 respectively extend backwards and upwards from both sides of the body 30, and they have substantially the same length, which is significantly smaller than the length of the control lever 10.

Referring to FIGS. 16 and 3, in some embodiments, the electric tool 100 comprises a rear wheel mounting structure 707 for mounting the support wheel 5115 and the dropping wheel 6116. The rear wheel mounting structure 707 comprises a dropping wheel mounting bracket 722 located between the body 30 and the dropping wheel 6116, a support wheel mounting bracket 771 located between the body 30 and the support wheel 5115, and a shaft 733 connected between the dropping wheel mounting bracket 722 and the support wheel mounting bracket 771. The dropping wheel mounting bracket 722, the support wheel mounting bracket 771, and the shaft 733 may be fixedly connected as an integral whole. The shaft 733 is parallel to the wheel shaft of the support wheel and runs through the body 30 in a rotatable manner, allowing the rear wheel mounting structure 707 to pivot around the shaft 733 relative to the body 30 as a whole. Further, the portion of the support wheel mounting bracket 771 that is away from the shaft 733 is fixedly connected to the wheel shaft 5111 of the support wheel 5115. For example, the support wheel mounting bracket 771 is a triangular plate-shaped mounting bracket, and the shaft 733 is connected to a first end 711 of the triangle; the wheel shaft 5111 of the support wheel 5115 is connected to a second end 712 of the triangle; a third end 713 of the triangle may further be connected to the front wheel mounting bracket 808 through a front and rear wheel connecting rod 78.

The body lifting mechanism is configured to operate the support wheel mounting bracket 771, causing it to pivot around the shaft 733 relative to the body 30, so that the wheel shaft 5111 of the support wheel 5115 moves up and down relative to the body 30, thus achieving the objective of adjusting the height of the body 30 relative to the support wheel 5115. The body lifting mechanism will be described in detail below.

Figure 18:
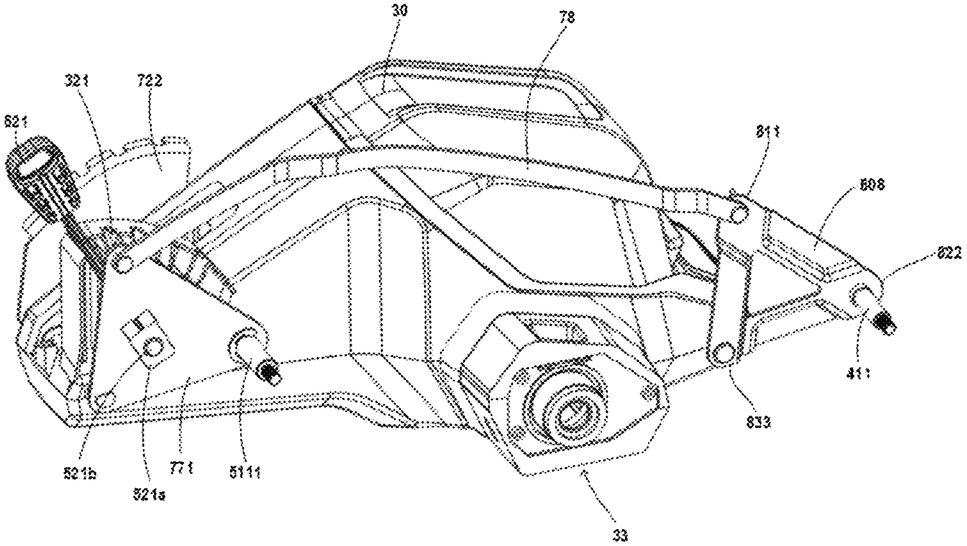
FIG. 18 is a view taken from the right side perspective of the electric tool in FIG. 16, where the support wheel and the front wheel are omitted to clearly show the support wheel mounting bracket and the front wheel mounting bracket.
Figure 19:
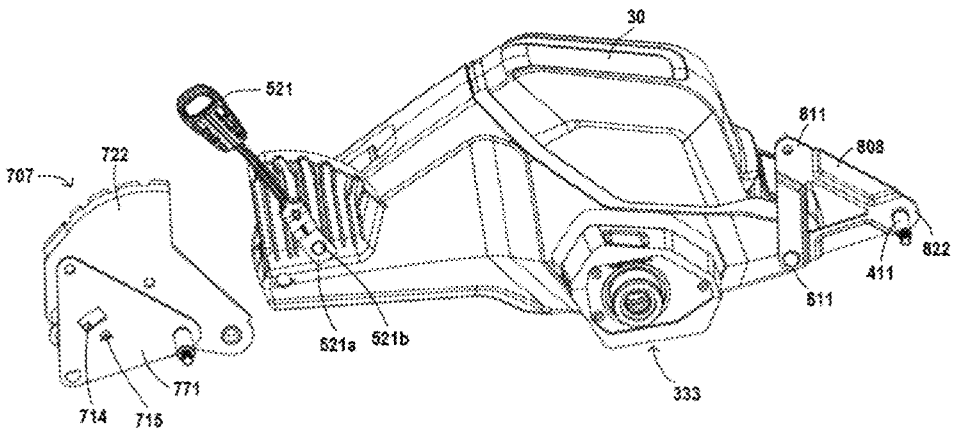
FIG. 19 is a partial exploded view of FIG. 18, where the rear wheel mounting component is separated from the body, and the front and rear wheel connecting rod is omitted.
Figure 20:
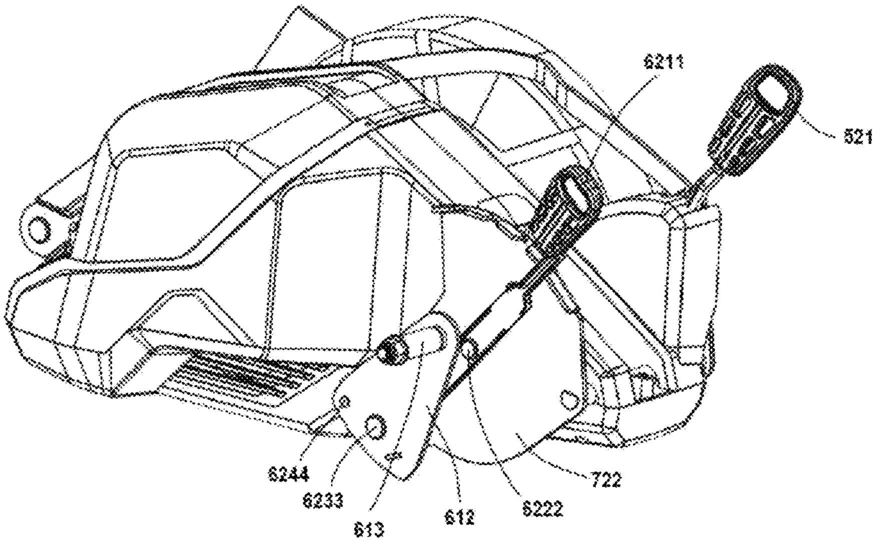
FIG. 20 is a view taken from the left side perspective of the electric tool in FIG. 16, where the main structure of the dropping wheel is omitted to clearly show the dropping wheel mounting bracket and the hub carrier.
Figure 21:
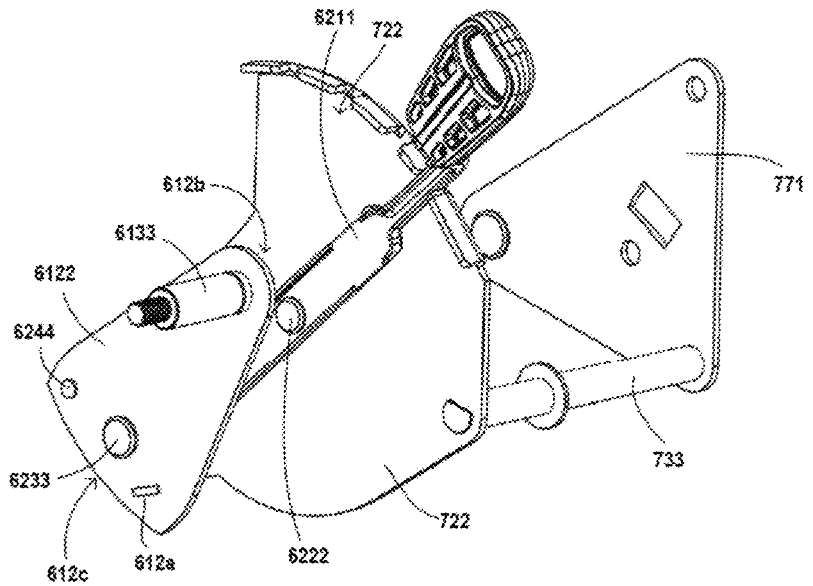
FIG. 21 is a separate schematic diagram of the rear wheel mounting component and the hub carrier in FIG. 20 in an assembled state.

Referring to FIG. 18-FIG. 19, the body lifting control handle 521 is located between the body 30 and the support wheel mounting bracket 771. The body lifting control handle 521 is configured to rotate relative to the body 30 in a rotation plane perpendicular to the wheel shaft 5111, and to be locked when it rotates to a predetermined angular position relative to the body 30. For example, the top of the support wheel mounting structure 322 of the body 30 is formed with at least two limit grooves 321 that open towards the support wheel 5115 and are arranged substantially in a forward and backward direction, and the body lifting control handle 521 can be accommodated in the limit grooves 321 and thus locked at different angular positions relative to the body 30. For the convenience of observation and description, in FIG. 18 and FIG. 19, the operating component 31 is hidden, and only the mounting structure 333 of the operating component 31 on the body 30 is shown.

In some embodiments, the body lifting control handle 521 and the support wheel mounting bracket 771 are fixedly connectible to each other. For example, referring to FIG. 17-FIG. 19, the bottom end of the body lifting control handle 521 has a protruding tongue piece 521*a*, a slot 714 is provided on the support wheel mounting bracket 771, the tongue piece 521*a* extends from the inner side of the support wheel mounting bracket 771 through the slot 714 to the outer side of the support wheel mounting bracket 771, bends, and then is fixed to the outer surface of the support wheel mounting bracket 771 through a fixing member 521*b*, wherein the fixing member 521*b* may be a screw, a nut, a rivet, etc., and a fixing member mounting hole 715, adjacent to the slot 714, for accommodating the fixing member 521*b* is provided on the support wheel mounting bracket 771. Preferably, the body lifting control handle 521 is connected to the body 30 through a pivot fixed to the body, and the axis of the pivot is non-coaxial with the wheel shaft 5111 of the support wheel, so when the body lifting control handle 521 rotates around its pivot, it drives the support wheel mounting bracket 771 to rotate together, thus causing the wheel shaft 5111 of the support wheel to move upwards and downwards relative to the body. In other embodiments not shown herein, the body lifting control handle may also be connected to the support wheel mounting bracket through a connecting rod, a pivot, or another structure, and a slight relative movement is allowed between the body lifting control handle and the support wheel mounting bracket, as long as the body lifting control handle can drive the support wheel mounting bracket to rotate relative to the body; the body lifting control handle may also have another connection relationship with the body, as long as it is guaranteed that the body lifting control handle can rotate relative to the body without separating from the space between the body and the support wheel mounting bracket.

Figure 17:
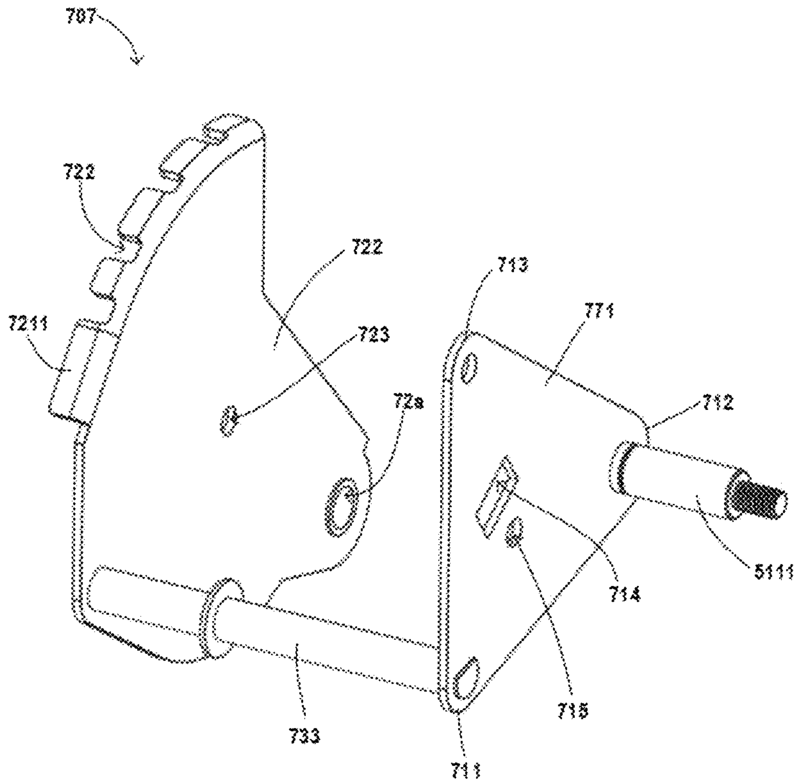
FIG. 17 is a three-dimensional schematic diagram of the rear wheel mounting component in FIG. 16.

Referring to FIG. 17 and FIG. 18, when the body lifting control handle 521 is actuated in the clockwise direction, the support wheel mounting bracket 771 also rotates clockwise around the shaft 733 relative to the body 30, and the second end 712 of the support wheel mounting bracket 771 moves downwards relative to the body 30, driving the wheel shaft 5111 of the support wheel 5115 to move downwards relative to the body 30, so that the body 30 moves upwards relative to the wheel shaft 5111 of the support wheel 5115. During operation, the bottom of the support wheel 5115 is usually in contact with the operating plane, so the actuation process actually raises the body 30 relative to the operating plane. When the body lifting control handle 521 is actuated in the counterclockwise direction, the body 30 moves downwards relative to the operating plane.

Since the rear wheel mounting structure 707 is an integral component, the body lifting mechanism can cause the rear wheel mounting structure 707 to pivot as a whole relative to the body 30, so the dropping wheel 6116 will also move upwards and downwards relative to the body 30 with the operation of the body lifting mechanism. Due to the fact that the support wheel mounting bracket 771 is further connected to the front wheel mounting bracket 808 through the front and rear wheel connecting rod 78, when the support wheel mounting bracket 771 pivots relative to the body 30 and changes the height of the support wheel 5115 relative to the body 30, the front wheel mounting bracket 808 will also be actuated by the front and rear wheel connecting rod 78 to drive the front wheel 32 to also move upwards and downwards relative to the body 30. Again referring to FIG. 18, the front wheel mounting bracket 808 has a substantially triangular frame structure, the front and rear wheel connecting rod 78 is connected to the first end 811 of the front wheel mounting bracket 808, the second end 822 of the front wheel mounting bracket 808 is connected to the wheel shaft 411 of the front wheel 32, and the third end 833 of the front wheel mounting bracket 808 is pivotally connected to the body 30.

In the above embodiment, both the support wheel mounting bracket 771 and the front wheel mounting bracket 808 may be driven by the body lifting mechanism. When the body lifting mechanism operates, it actually simultaneously adjusts the height of the support wheel 5115, dropping wheel 6116, and front wheel 32 relative to the body 30, so that after height adjustment, the support wheel 5115, dropping wheel 6116, and front wheel 32 remain at substantially the same height position.

In other embodiments not shown herein, the body lifting mechanism may be only used to adjust the height of the body relative to the support wheel, and the height of the dropping wheel and front wheel relative to the body may be adjusted not by the body lifting mechanism. For example, in an embodiment not shown herein, the dropping wheel mounting bracket may be integrated not with the support wheel mounting bracket, and instead only the shaft is fixedly connected to the support wheel mounting bracket, wherein the shaft is inserted into the body in a rotatable manner, rather than necessarily running through the body. When the body lifting mechanism is in operation, only the support wheel mounting bracket pivots relative to the body, and the dropping wheel mounting bracket does not move relative to the body. Even in an embodiment not shown herein, the dropping wheel mounting bracket may be removed and the dropping wheel may be mounted on the body in another manner. In addition/alternatively, in an embodiment not shown herein, a connecting rod is not necessarily arranged between the support wheel mounting bracket and the front wheel mounting bracket, wherein when the body lifting mechanism is operating, only the support wheel mounting bracket pivots relative to the body, while the front wheel mounting bracket does not move relative to the body. The height of the dropping wheel relative to the body and the height of the front wheel relative to the body may be independently adjusted by another lifting mechanism.

In some embodiments, the dropping wheel 6116 is further provided with a dropping wheel lifting mechanism to further adjust the height of the dropping wheel 6116 relative to the body 30. When the body lifting mechanism is locked, the dropping wheel mounting bracket 722 is fixed relative to the body 30, in which case the dropping wheel lifting mechanism can adjust the height of the dropping wheel 6116 relative to the dropping wheel mounting bracket 722, thereby adjusting the height of the dropping wheel 6116 relative to the body 30. The dropping wheel 6116 comprises, for example, a hub 6111 and a hub carrier 6122 located between the hub 6111 and the dropping wheel mounting bracket 722 (see FIG. 16), the dropping wheel lifting mechanism is positioned between the dropping wheel mounting bracket 722 and the hub carrier 6122, and, in FIG. 20, the hub 6111 is omitted to show the structure of the hub carrier 6122.

Referring to FIG. 20-FIG. 22B, the portion of the hub carrier 6122 near a first edge 612*b* thereof is fixedly connected to the wheel shaft 6133 of the dropping wheel 6116, the portion of the hub carrier 6122 near a second edge 612*c* thereof is pivotably connected to the dropping wheel mounting bracket 722 through a pivot 6233, and a pivot receiving groove 72*a* is formed on the dropping wheel mounting bracket 722 to receive the pivot 6233. The first edge 612*b* and the second edge 612*c* are opposite edges of the hub carrier 6122. For example, the hub carrier 6122 can substantially form a planar conical structure, with the first edge 612*b* being the top edge of the conical structure, and the second edge 612*c* being the edge at the bottom centre of the conical structure.

Figure 22A:
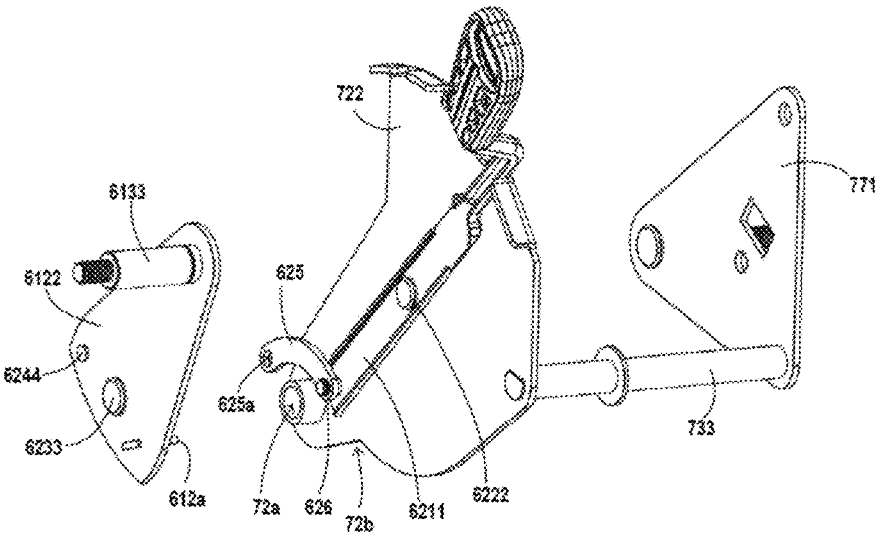
Figure 22B:
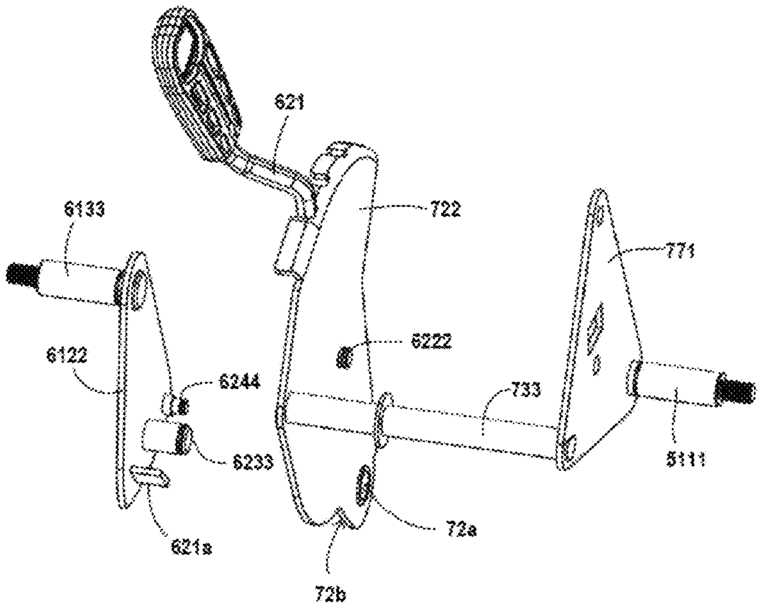

Again referring to the schematic diagram of the dropping wheel mounting bracket 722 shown in FIG. 17, as well as the exploded schematic diagrams of the hub carrier 6122 and the dropping wheel mounting bracket 722 shown in FIG. 22A and FIG. 22B, the dropping wheel lifting control handle 6211 is configured to rotate relative to the dropping wheel mounting bracket 722 in a rotation plane perpendicular to the wheel shaft 6133, and to be locked when it pivots to a predetermined angular position relative to the dropping wheel mounting bracket 722. For example, the top of the dropping wheel mounting bracket 722 is provided with a protrusion 7211 that extends outwards, at least two limit grooves 722 are formed on the protrusion 7211, which open towards the dropping wheel 6116 and are arranged substantially in the forward and backward directions, and the dropping wheel lifting control handle 6211 can be accommodated in the limit grooves 722 to be locked relative to the dropping wheel mounting bracket 722.

Further, the dropping wheel lifting control handle 6211 is connected to the dropping wheel mounting bracket 722 through a pivot 6222 fixed to the dropping wheel mounting bracket 722, wherein, preferably, the pivot 6222 is located at the centre of the dropping wheel mounting bracket 722. A pivot hole 723 for accommodating the pivot 6222 is arranged at substantially the centre position of the dropping wheel mounting bracket 722 (see FIG. 17). In other embodiments not shown herein, the dropping wheel lifting control handle 6211 may have another fixation relationship with the dropping wheel mounting bracket 722, as long as it is guaranteed that the dropping wheel lifting control handle 6211 can rotate relative to the dropping wheel mounting bracket 722 without separating from the dropping wheel mounting bracket 722.

The dropping wheel lifting mechanism further comprises a connecting rod 625, and one end of the connecting rod 625 is pivoted to the end of the dropping wheel lifting control handle 6211 opposite the control portion through a pivot 626. The pivot 626 is only fixed relative to the end of the connecting rod 625 connected to the dropping wheel lifting control handle 6211, and there is no fixed connection relationship between the pivot 626 and the dropping wheel mounting bracket 722. The other end of the connecting rod 625 (the end provided with a pivot hole 625*a*) is pivoted to the hub carrier 6122 through a pivot 6244, preferably pivoted to a position of the hub carrier 6122 near the second edge 612*c* (that is, pivoted to a position at the bottom end of the hub carrier 6122 that forms a flat conical structure). The pivot 6244 is fixed only relative to the end of the connecting rod 625 connected to the hub carrier 6122, and there is no fixed connection relationship between the pivot 6244 and the dropping wheel mounting bracket 722. Preferably, the connecting rod 625 is a curved connecting rod 625 that extends around the pivot 6233, and when the connecting rod 625 is activated, it rotates substantially around the pivot 6233. Here, the pivots 6233, 6244 and 626 are non-coaxial and are parallel to the axis direction of the wheel shaft 6133 of the dropping wheel.

Preferably, a limit plate 612*a* protruding towards the dropping wheel mounting bracket 722 is provided at the position near the bottom-side rear end of the hub carrier 6122, and a limit bottom wall 72*b* is provided at the position corresponding to the limit plate 612*a* of the dropping wheel mounting bracket 722. When the hub carrier 6122 pivots relative to the dropping wheel mounting frame 722, the limit plate 612*a* slides along the limit bottom wall 72*b* (there may be a gap between them). The fitting relationship between the limit plate 612*a* and the limit bottom wall 72*b* is such that damage due to an excessive relative pivot angle between the hub carrier 6122 and the dropping wheel mounting frame 722 is avoided.

Again referring to FIG. 20-FIG. 22B, an operator can adjust the height of the dropping wheel 6116 relative to the body 30 by actuating the dropping wheel lifting control handle 6211. For example, when the dropping wheel lifting control handle 6211 rotates counterclockwise (based on the perspective shown in FIG. 20-FIG. 22A) relative to the dropping wheel mounting bracket 722, the bottom end of the dropping wheel lifting control handle 6211, through the pivot 626, drives the connecting rod 625 to move clockwise downwards, causing the other end of the connecting rod 625 to, through the pivot 6244, drive the hub carrier 6122 to rotate clockwise, causing the end of the hub carrier 6122 mounted with the pivot 6244 to move upwards. Since the hub carrier 6122 is connected to the dropping wheel mounting bracket 722 through a pivot 6233 fixed to the dropping wheel mounting bracket 722, when the end of the hub carrier 6122 with the pivot 6244 moves upwards, the other end away from the pivot 6244 (that is, the end connected to the wheel shaft 6133 of the dropping wheel 6116) moves downwards, causing the dropping wheel 6116 to move downwards relative to the body 30. Similarly, when the dropping wheel lifting control handle 6211 rotates clockwise (based on the perspective shown in FIG. 20-FIG. 22A) relative to the dropping wheel mounting bracket 722, the dropping wheel 6116 moves upwards relative to the body 30.

It should be further noted that although the dropping wheel mounting bracket is driven by the body lifting mechanism, the dropping wheel lifting mechanism remains independent of the body lifting mechanism. This is because the dropping wheel lifting mechanism can adjust the position of the dropping wheel relative to the dropping wheel mounting bracket, while the position of the dropping wheel mounting bracket itself and the motion state of the dropping wheel mounting bracket itself have no significant impact on the movement of the dropping wheel relative thereto. In other words, in some embodiments, the height adjustment of the dropping wheel relative to the body is the superposition of the operation results of the body lifting mechanism and the operation results of the dropping wheel lifting mechanism, but the operation process of the dropping wheel lifting mechanism and the operation process of the body lifting mechanism are independent of each other.

In addition, as mentioned earlier, a dropping wheel mounting bracket is optional, and, in some embodiments, a dropping wheel mounting bracket that may be driven by the body lifting mechanism may not be arranged, and the hub carrier of the dropping wheel may be directly connected to the body. In this embodiment, the height of the dropping wheel relative to the body changes only with the operation of the dropping wheel lifting mechanism.

An electric tool of the present invention is not necessarily limited to an edger, and the electric tool may also be used in another operating machine, for example, a mower. In an operating machine, for example, a mower, the electric tool, besides a front wheel located on one side of the body, further comprises another front wheel located on the other side of the body.

It is clear from the above embodiment that an electric tool of the present invention has two height adjustment mechanisms, one of which can adjust the height of the body relative to the operating plane, and the other of which can adjust the operating height of the dropping wheel relative to the body, so that while the height of the body is adjustable, the two rear wheels can further have a required height difference. Such an electric tool is more widely applicable, for example, being suitable for an operating plane with different heights or degrees of unevenness on the left and right sides thereof. Moreover, the two height adjustment mechanisms are operable independently of each other, providing great flexibility in use.

An electric tool of the present invention provides a stop mechanism for preventing the operation of the operating component during replacement of the operating component, the stop mechanism acting on an arresting disc on the output shaft, wherein the output shaft itself may be a motor shaft, and the arresting disc may be directly arranged on the motor shaft, or the electric tool may comprise a transmission mechanism, while the arresting disc may be integrally formed on the transmission gear of the transmission mechanism. A stop mechanism of the present invention is easy to operate, delivers good safety performance, and has a relatively simple structure, which allows convenient production and subsequent maintenance. Further, a stop mechanism of the present invention automatically springs back to a non-stop position detached from the output shaft or the transmission gear when the external force (for example, a manually applied pressing force) is lost, which prevents possible damage to the output shaft or transmission mechanism when a user starts the electric tool before releasing the stop mechanism.

The above description of a plurality of embodiments of the present invention is provided for illustrative purposes to a person skilled in the art. It is not intended that the present invention be exclusive or be limited to a single disclosed embodiment. As above, those skilled in the field of the above teaching will understand various alternatives and variants of the present invention. Thus, although some alternative embodiments have been specifically described, those skilled in the art will understand, or develop with relative ease, other embodiments. The present invention is intended to include all alternatives, modifications and variants of the present invention described here, as well as other embodiments which fall within the spirit and scope of the present invention described above.

The invention claimed is:

1. An electric tool comprising:

a body internally provided with a motor;

an operating component mounted on one side of the body;

an output shaft configured to transmit output of the motor to the operating component, wherein an arresting disc is provided on the output shaft, and a groove is formed on the arresting disc; and a stop mechanism comprising:

a protrusion; and an operating component defining an accommodating space having a receiving sleeve, and wherein the protrusion is at least partially disposed in the receiving sleeve, wherein the stop mechanism is operable so that the protrusion extends from the accommodating space to insert into the groove to lock the output shaft.

2. The electric tool according to claim 1, wherein the groove extends radially along a base of the arresting disc and has a radially outward opening, and in that the protrusion is configured to enter the groove radially inwards through the opening, wherein the groove is formed at an edge of the base, wherein the groove comprises at least two grooves arranged on the base, and wherein the at least two grooves are evenly spaced circumferentially.

3. The electric tool according to claim 2, wherein a plurality of protruding curved segments extending circumferentially are arranged on the base, and in that a spacing between adjacent curved segments forms the groove, wherein, specifically, the number of the curved segments is four, specifically the plurality of curved segments extend along a circumferential edge of the base, and specifically a length of the curved segment is $\frac{1}{6}$-$\frac{1}{5}$ of the circumference of the base.

4. The electric tool according to claim 3, wherein each end of each curved segment is formed with an extension segment that extends radially relative to the curved segment, and in that opposite extension segments of adjacent curved segments are laterally parallel to each other to jointly define the groove, wherein the length of the extension segment extending radially inwards relative to the curved segment is $\frac{1}{5}$-$\frac{1}{3}$ of the radius of the base.

5. The electric tool according to claim 2, wherein the stop mechanism further comprises:

an elastic component connected to the operating component and/or the protrusion, wherein the elastic component is configured to provide the protrusion with a restoring force offset towards a direction in which the protrusion detaches from the groove.

6. The electric tool according to claim 5, wherein the operating component comprises an end wall and a continuous side wall connected to the end wall, wherein the protrusion is inserted into the receiving sleeve, and wherein the elastic component is a spring surrounding the protrusion.

7. The electric tool according to claim 6, wherein the operating component further comprises at least two clasp feet extending from the side wall away from the end wall, and in that ends of the clasp feet are configured to be snap-fitted to the housing of the body.

8. The electric tool according to claim 1, wherein the electric tool further comprises a transmission gear, a base of the arresting disc is integrally formed on an end face of the transmission gear wherein a driving gear is fixedly mounted on an output end of the output shaft of the motor, wherein the transmission gear and the driving gear externally engage, wherein a diameter of the transmission gear is larger than that of the driving gear, and wherein the output shaft of the electric tool is coaxially and fixedly connected to the transmission gear.

9. The electric tool according to claim 8, wherein an assembly shell for accommodating the driving gear and the transmission gear is provided in the housing of the body, wherein an inner contour of the assembly shell fits an outer contour of the driving gear and the transmission gear, and the output shaft, the output shaft of the electric tool, and the protrusion respectively run through the assembly shell.

10. The electric tool according to claim 1, wherein the output shaft is a motor shaft of the motor, one end of the output shaft near the motor is provided with a recessed shaft shoulder, a recessed platform portion extends from the shaft shoulder towards the other end of the output shaft, and a central through-hole of the arresting disc is provided with a flat portion corresponding to the platform portion, wherein an end face of the arresting disc rests against the shaft shoulder, and the flat portion is assembled on the platform portion.

11. The electric tool according to claim 7, wherein a mounting support is mounted on the housing corresponding to the arresting disc, and in that a vane is provided on the mounting support, wherein the vane is provided with an opening, the protrusion can enter the groove through the opening, at least two slots are arranged around the opening, and the at least two clasp feet are movable through the at least two slots.

12. The electric tool according to claim 11, wherein a frame is mounted on the housing, the frame having a central base and at least two curved arms located outside the central base, wherein the at least two curved arms are spaced apart from each other through at least two connecting arms and connected to the central base respectively through the connecting arms, and the mounting support is mounted between two connecting arms.

13. The electric tool according to claim 12, wherein the elastic component is arranged between the operating component and/or the protrusion and the vane.

14. The electric tool according to claim 1, wherein the electric tool is an electric tool for gardening, particularly an edger or mower.

15. An electric tool comprising:

a body internally provided with a motor;

an operating component mounted adjacent one side of the body:

an output shaft configured to transmit output of the motor to the operating component;

an arresting disc provided at the output shaft, wherein the arresting disc comprises a groove;

a stop mechanism comprising a protrusion, wherein the stop mechanism is configured to extend the protrusion to insert into the groove to lock the output shaft;

a front wheel and a support wheel that are located on one side of the body, the support wheel being in a rear position relative to the front wheel, and a dropping wheel located on the other side of the body, wherein the operating component and the support wheel are located on an identical side of the body;

a body lifting mechanism, which is configured to adjust a height of the body relative to the support wheel; and a dropping wheel lifting mechanism, which is configured to adjust a height of the dropping wheel relative to the body.

16. The electric tool according to claim 15, wherein the electric tool comprises a support wheel mounting bracket located between the support wheel and the body, and a shaft fixedly connected to the support wheel mounting bracket, the shaft is parallel to a wheel shaft of the support wheel and is rotatably inserted into the body, and the support wheel mounting bracket is fixedly connected to the wheel shaft, wherein the body lifting mechanism is configured to be operable to pivot the support wheel mounting bracket around the shaft relative to the body.

17. The electric tool according to claim 16, wherein the body lifting mechanism comprises a body lifting control handle located between the support wheel mounting bracket and the body, wherein the body lifting control handle is configured to be rotatable relative to the body in a rotation plane perpendicular to the wheel shaft and to be locked when it rotates to a predetermined angular position relative to the body, wherein a top of the body is formed with at least two limit grooves facing an opening of the support wheel and arranged in a forward and a backward direction, and the body lifting control handle can be accommodated in the limit grooves to be locked at different angular positions relative to the body.

18. The electric tool according to claim 17, wherein the support wheel mounting bracket is formed into a triangle, a first end of the support wheel mounting bracket is connected to the shaft, a second end of the support wheel mounting bracket is fixedly connected to the wheel shaft, and a third end of the support wheel mounting bracket is connected, through a front and rear wheel connecting rod, to a front wheel mounting bracket for mounting the front wheel, wherein the front wheel mounting bracket is triangular, the front and rear wheel connecting rod is connected to a first end of the front wheel mounting bracket, a second end of the front wheel mounting bracket is fixedly connected to the wheel shaft of the front wheel, and a third end of the support wheel mounting bracket is pivotally connected to the body.

19. The electric tool according to claim 18, wherein the electric tool comprises a dropping wheel mounting bracket located between the dropping wheel and the body, the dropping wheel lifting mechanism is configured to be operable so that the wheel shaft of the dropping wheel is pivotable relative to the dropping wheel mounting bracket, and the shaft runs through the body and is fixedly connected to the dropping wheel mounting bracket.

20. The electric tool according to claim 19, wherein the dropping wheel comprises a hub and a hub carrier located between the hub and the dropping wheel mounting bracket, wherein a portion of the hub carrier near a first edge thereof is fixedly connected to the wheel shaft of the dropping wheel, and the portion of the hub carrier near a second edge thereof is connected to the dropping wheel mounting bracket through a pivot, wherein the first edge and the second edge are opposite edges of the hub carrier, and the dropping wheel lifting mechanism is positioned between the dropping wheel mounting bracket and the hub carrier.

* * * * *